United States Patent
Hittle et al.

(10) Patent No.: US 10,641,140 B2
(45) Date of Patent: May 5, 2020

(54) HYDRAULIC EARLY ENGINE EXHAUST VALVE OPENING SYSTEM

(71) Applicant: Caterpillar Inc., Peoria, IL (US)

(72) Inventors: Craig Phillip Hittle, Dunlap, IL (US); David Andrew Pierpont, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 183 days.

(21) Appl. No.: 15/593,828

(22) Filed: May 12, 2017

(65) Prior Publication Data

US 2018/0328240 A1 Nov. 15, 2018

(51) Int. Cl.
| | |
|---|---|
| *F01L 1/34* | (2006.01) |
| *F01L 9/02* | (2006.01) |
| *F02M 63/00* | (2006.01) |
| *F02D 13/02* | (2006.01) |
| *F01L 13/06* | (2006.01) |
| *F02M 57/04* | (2006.01) |
| *F01L 1/18* | (2006.01) |
| *F01L 1/26* | (2006.01) |
| *F01L 1/08* | (2006.01) |
| *F01L 1/20* | (2006.01) |

(52) U.S. Cl.
CPC .............. *F01L 9/025* (2013.01); *F01L 1/181* (2013.01); *F01L 9/021* (2013.01); *F01L 13/065* (2013.01); *F02D 13/0253* (2013.01); *F02M 57/04* (2013.01); *F02M 63/0008* (2013.01); *F01L 1/08* (2013.01); *F01L 1/20* (2013.01); *F01L 1/267* (2013.01); *F01L 2800/12* (2013.01)

(58) Field of Classification Search
CPC ... F01L 1/18; F01L 1/3442; F01L 1/20; F01L 1/267; F01L 9/025; F01L 13/065
USPC .......................................... 123/90.15, 90.17
See application file for complete search history.

(56) References Cited

U.S. PATENT DOCUMENTS

| | | | |
|---|---|---|---|
| 5,626,116 A | 5/1997 | Cummins | |
| 5,937,807 A | 8/1999 | Cummins | |
| (Continued) | | | |

OTHER PUBLICATIONS

Roberts, et al; "Modeling the impact of early exhaust valve opening on exhaust aftertreatment thermal management and efficiency for compression ignition engines"; International Journal of Engine Research; 2015; vol. 16(6); pp. 773-794.

(Continued)

*Primary Examiner* — Ching Chang
(74) *Attorney, Agent, or Firm* — Miller, Matthias & Hull

(57) ABSTRACT

An early exhaust valve opening (EEVO) module increases a no-load engine speed so an engine can smoothly transition to driving a load when necessary. The EEVO module includes a drive piston engaging an injector rocker and a driven piston engaging an exhaust rocker. The pistons are fluidly connected by a activation fluid passage so that the drive piston compresses air in the passage when an injector cam rotates the injector rocker and causes movement of the driven gear and the exhaust rocker to open an exhaust valve to release exhaust energy during a piston expansion stroke to limit the energy transferred to a crankshaft. A low pressure timing valve may drain pressurized fluid from the passage during an initial portion of the movement of the drive piston so driven piston does not move to open the exhaust valve until a desired amount of energy has been transferred to the crankshaft.

20 Claims, 11 Drawing Sheets

(56) References Cited

U.S. PATENT DOCUMENTS

| | | |
|---|---|---|
| 6,647,954 B2 | 11/2003 | Yang et al. |
| 7,063,055 B2 * | 6/2006 | Bloms .................. F01L 9/021 123/90.44 |
| 7,712,449 B1 | 5/2010 | Jacobs |
| 7,793,624 B2 | 9/2010 | Jacobs |
| 9,068,478 B2 | 6/2015 | Jacobs |
| 9,234,467 B2 | 1/2016 | Jacobs |

OTHER PUBLICATIONS

Unknown; "The Impact of Valve Events Upon Engine Performance and Emissions"; 2006; article; pp. 1-10.

* cited by examiner

HYDRAULIC EARLY ENGINE EXHAUST VALVE OPENING SYSTEM

TECHNICAL FIELD

The present disclosure relates generally to diesel engines and, more particularly, to Early Exhaust Valve Opening (EEVO) in diesel engines initiated by fuel injector cams and injector rockers.

BACKGROUND

Diesel engines are used to provide power in a variety of applications, such as vehicle and work machine propulsion and a variety of other industrial applications. In some of these applications, the diesel engine may be required to remain on and idling with a light load or no load, and then be able to instantaneously apply full power at cutover to driving a load. In one example, a diesel engine may be a backup power source for a device such as a generator, with the backup engine being engaged to drive the device if the primary power source fails. In applications such as backing up hospital generators, it may be critical for the backup engine to transition to driving the generator immediately so that transmission of electricity to critical equipment and systems of the hospital is not interrupted.

To ensure that the diesel engine can provide the necessary power at cutover to driving a load, a higher fuel flow rate must be maintained than is required to operate the engine at the idle speed. Additionally, other systems may require greater energy output by the idling engine in order to handle the load, such as turbochargers that require higher exhaust manifold energy to drive the turbocharger and provide boost pressure to the engine so the engine does not have to use energy to suck air into the manifold. Methods exist for increasing the fuel flow rate and producing extra exhaust energy to spool up a turbocharger when the engine is on standby and would be idling. In one method, an actual parasitic load is applied to the backup engine. An oil pump or another generator can be hooked up to waste energy back into a cooling system or other system that can dissipate the energy. The parasitic load makes the engine governor think that the generator or other work load is engaged, and the governor reacts by increasing the fuel flow rate to maintain the engine speed. The parasitic load is removed when the backup engine cuts over to the generator load, and the backup engine is already operating with the necessary fuel flow rate and the turbocharger spooled up to drive the generator.

As an alternative to an actual parasitic load, the backup engine can be tricked into increasing the fuel flow rate and exhaust energy output by applying a virtual parasitic load. One strategy for creating a virtual parasitic load involves releasing exhaust energy from the engine cylinders during the expansion stroke before all the combustion energy is transferred to the crankshaft. A small fuel burn is allowed to occur before opening the exhaust valve to keep the engine turning, but much of the energy is dissipated. At low fuel flow rates such as fuel flows that should cause the engine to run at the idle speed, insufficient energy is created during the partial fuel burn to achieve the idle speed. The engine governor responds in a similar manner as when an actual load is applied by increasing the fuel flow rate until the engine gets up to the idle speed. At the same time, the excess exhaust energy will spool up the turbocharger so the fuel flow rate and the intake manifold pressure are at the levels required for a smooth transition during the transient response to cutover to driving the generator.

Early Exhaust Valve Opening (EEVO) for creating virtual parasitic loads as described above can be an effective solution to increasing fuel flow rates, intake manifold pressures and exhaust temperatures without increasing the engine power output. U.S. Pat. No. 5,937,807 issued to Peters et al. on Aug. 17, 1999, entitled "Early Exhaust Valve Opening Control System and Method," discloses an exhaust valve system for an internal combustion engine including a turbocharger for effectively increasing the turbocharged boost pressure at low load engine conditions to improve engine transient response. The exhaust valve system includes an advanced timing mode for advancing the timing of the opening of the exhaust valve to an advanced opening crank angle prior to the normal opening crank angle while maintaining the timing of normal closing of the exhaust valves at a normal closing crank angle. The exhaust valve control device includes a dedicated advanced timing mode rocker lever capable of selectively actuating one of a pair of exhaust valves to create an early opening exhaust event prior to a normal exhaust event. An advanced cam lobe on the camshaft has a cam profile shape capable of the advanced timing mode rocker lever to pivot through an early opening exhaust valve stroke prior to the normal exhaust valve event.

U.S. Pat. No. 9,234,467 issued to Ernest et al. on Jan. 12, 2016, entitled "Engine System and Operation Method Using Engine Braking Mechanisms for Early Exhaust Valve Opening," discloses a valve actuation system for an internal combustion engine that includes one or more first cams having a compression-release lobe and a main exhaust lobe adapted to transfer valve actuation motion to a first set of exhaust valves, and one or more second cams having an EEVO lobe and a main exhaust lobe adapted to transfer valve actuation motion to a second set of exhaust valves. The valve actuation system may provide any combination of main exhaust valve actuation with or without compression release actuation with main exhaust valve actuation with or without EEVO for the two sets of cylinders. Compression release or compression braking uses the engine to absorb power and provide a retarding force to slow a vehicle or machine in situations such as when the vehicle or machine is traveling downhill. To achieve compression braking, fuel flow to the engine is cutoff and the engine is turned into an air compressor driven by the machine's momentum. The intake and exhaust valves are generally operated as normal, and air is compressed in the engine cylinders during the compression stroke. The valve actuation system of Ernest et al. either provides an additional compression release lobe on the exhaust cam, or an additional cam with a compression release lobe, to open the exhaust valves when the cylinders reach top dead center of the compression strokes to blow the compressed air into the exhaust system instead of transferring power to the crankshaft. In both the Peters et al. and the Ernest et al. systems, early exhaust valve opening for EEVO events and/or compression braking is accomplished by modifying the exhaust valve cams or providing additional exhaust valve cams.

SUMMARY OF THE DISCLOSURE

In one aspect of the present disclosure, an early exhaust valve opening (EEVO) module for an engine is disclosed. The engine may include an exhaust valve, an exhaust rocker rotatable to move the exhaust valve between an exhaust valve closed position and an exhaust valve open position, a fuel injector, an injector rocker rotatable to cause the fuel injector to inject fuel into an engine cylinder of the engine, and a camshaft having an exhaust cam engaging and rotating the exhaust rocker between the exhaust valve open position and the exhaust valve closed position as the camshaft rotates and an injector cam engaging and rotating the injector rocker to cause the fuel injector to inject fuel into the engine cylinder as the camshaft rotates. The EEVO module includes an EEVO housing mounted to the engine proximate the exhaust rocker and the injector rocker. The EEVO housing includes a drive piston bore having a drive piston bore top wall and a drive piston bore bottom end, a driven piston bore having a driven piston bore top wall and a driven piston bore bottom end, an activation fluid passage intersecting the drive piston bore and the driven piston bore proximate the drive piston bore top wall and the driven piston bore top wall, respectively, a fluid supply passage placing the activation fluid passage in fluid communication with a high pressure fluid source, and a spill passage intersecting the drive piston bore at a position between the drive piston bore top wall and the drive piston bore bottom end and placing the drive piston bore in fluid communication with a low pressure reservoir. The EEVO module further includes a drive piston disposed within the drive piston bore and biased toward the drive piston bore top wall, a driven piston disposed within the driven piston bore and biased toward the driven piston bore top wall, and a low pressure timing valve disposed in the spill passage between the drive piston bore and the low pressure reservoir and having a timing valve release pressure. The drive piston displaces toward the drive piston bore bottom end and engages the injector rocker and the driven piston displaces toward the driven piston bore bottom end and engages the exhaust rocker when an activation fluid passage pressure in the activation fluid passage is greater than an EEVO priming pressure that is sufficient to displace the drive piston and the driven piston against piston biasing forces. The low pressure timing valve opens to drain fluid from the drive piston bore to the low pressure reservoir and the driven piston does not displace the exhaust rocker when the activation fluid passage pressure is greater than the timing valve release pressure and less than an exhaust valve displacement pressure required for the driven piston to displace the exhaust rocker and open the exhaust, the injector rocker displaces the drive piston toward the drive piston bore top wall, and the drive piston does not close the spill passage. Also, the driven piston displaces the exhaust rocker to open the exhaust valve when the injector rocker displaces the drive piston over the spill passage to close the spill passage and the activation fluid passage pressure is greater than the exhaust valve displacement pressure.

In another aspect of the present disclosure, a method for operating an early exhaust valve opening (EEVO) module of an engine. The method includes starting the engine, engaging, by the EEVO module, an injector rocker and an exhaust rocker so that rotation of the injector rocker caused by engagement of an injector cam of a camshaft of the engine causes the EEVO module to rotate the exhaust rocker to open the exhaust valve after a compression stroke of an engine piston in an engine cylinder, sensing an intake manifold pressure, continuing to engage the injector rocker and the exhaust rocker and rotate the exhaust rocker to open the exhaust valve in response to rotation of the injector rocker when the intake manifold pressure is less than a setpoint pressure, and disengaging the EEVO module from the injector rocker and the exhaust rocker so that rotation of the injector rocker does not cause the EEVO module to rotate the exhaust rocker when the intake manifold pressure is greater than the setpoint pressure.

In a further aspect of the present disclosure, an engine is disclosed. The engine includes an engine cylinder, an engine piston disposed within the engine cylinder, an exhaust valve for the engine cylinder biased toward an exhaust valve closed position, an exhaust rocker that is rotatable to move the exhaust valve from the exhaust valve closed position to an exhaust valve open position, a fuel injector, an injector rocker that is rotatable to cause the fuel injector to inject fuel into the engine cylinder, a camshaft having an exhaust cam engaging and rotating the exhaust rocker to move the exhaust valve to the exhaust valve open position as the camshaft rotates and an injector cam engaging and rotating the injector rocker to cause the fuel injector to inject fuel into the engine cylinder as the camshaft rotates, and an early exhaust valve opening (EEVO) module. The EEVO module includes an EEVO housing mounted proximate the exhaust rocker and the injector rocker, a drive piston disposed within a drive piston bore of the EEVO housing, and a driven piston disposed within a driven piston bore of the EEVO housing. The drive piston bore has a drive piston bore top wall and a drive piston bore bottom end, and the drive piston is biased toward the drive piston bore top wall. The driven piston bore has a driven piston bore top wall and a driven piston bore bottom end, and the driven piston is biased toward the driven piston bore top wall An activation fluid passage intersects the drive piston bore and the driven piston bore proximate the drive piston bore top wall and the driven piston bore top wall, respectively, and a fluid supply passage places the activation fluid passage in fluid communication with high pressure fluid source. The EEVO module further includes a low pressure timing valve disposed within a spill passage of the EEVO housing that intersects the drive piston bore at a position between the drive piston bore top wall and the drive piston bore bottom end and fluidly connecting the drive piston bore to a low pressure reservoir, wherein the low pressure timing valve has a timing valve release pressure. The EEVO module is primed by providing pressurized fluid from the high pressure fluid source to increase an activation fluid passage pressure to an EEVO priming pressure that causes the drive piston to displace toward the drive piston bore bottom end and engage the injector rocker and open the spill passage to the drive piston bore, and causes the driven piston to displace toward the driven piston bore bottom end and engage the exhaust rocker, wherein the EEVO priming pressure is less than the timing valve release pressure. Once the EEVO module is primed, displacement of the drive piston due to rotation of the injector rocker toward the drive piston bore top wall before the drive piston closes the spill passage increases the activation fluid passage pressure until the activation fluid passage pressure is at least equal to the timing valve release pressure and the low pressure timing valve opens to drain fluid from the drive piston bore to the low pressure reservoir, wherein the timing valve release pressure is less than an exhaust valve displacement pressure required for the driven piston to displace and cause the exhaust rocker to move the exhaust valve to the exhaust valve open position. After the spill passage is closed by the drive piston, further displacement of the drive piston toward the drive piston bore top wall increases the activation fluid passage pressure until the activation fluid passage pressure is greater than the exhaust valve displacement pressure and the driven piston is displaced and rotates the exhaust rocker move the exhaust valve to the exhaust valve open position.

Additional aspects are defined by the claims of this patent.

DETAILED DESCRIPTION

Figure 1:
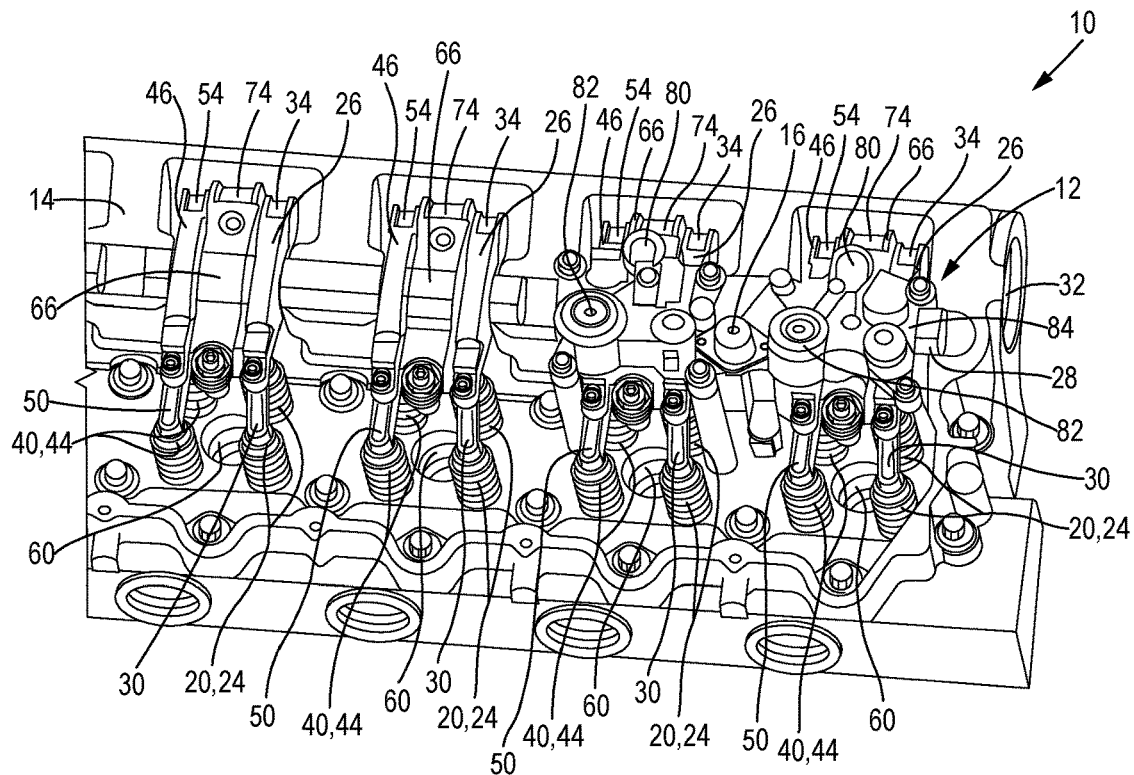
FIG. 1 is an isometric view of an engine cylinder head of an engine such as a diesel engine having an EEVO module in accordance with the present disclosure.
Figure 2:
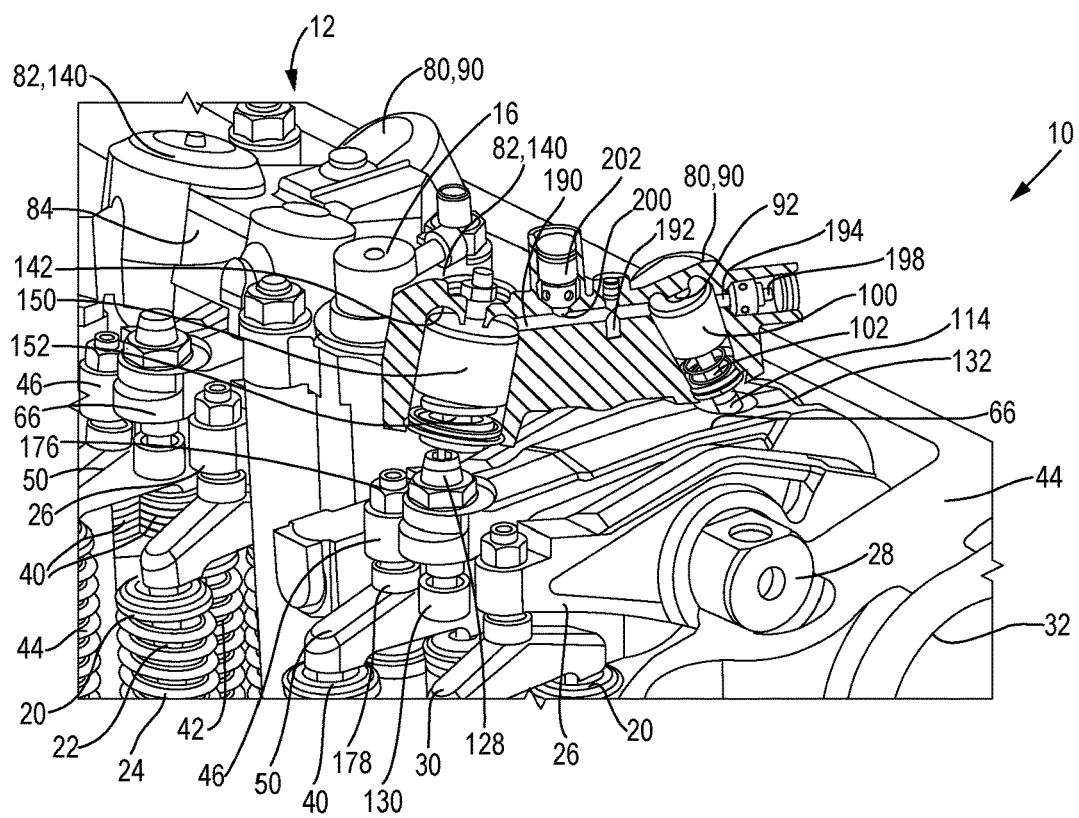
FIG. 2 is an enlarged isometric view of the cylinder head of the engine of FIG. 1 with an EEVO housing of the EEVO module shown in partial cross-section.

FIGS. 1 and 2 illustrate a portion of an engine 10 having an EEVO module 12 in accordance with the present disclosure mounted on an engine cylinder head 14. The engine 10 may be a diesel engine and may be used as a backup power source for a generator that will cut over to drive the generator when a primary power source fails. However, the engine 10 with the EEVO module 12 may be implemented in other applications where it may be desirable to provide EEVO to increase fuel flow in the engine 10 when no load is applied or to provide compression braking.

As illustrated, a cover of the engine cylinder head 14 is removed so that the engine components, including the EEVO module 12, can be viewed. The engine cylinder head 14 may have 6, 8 or more associated engine cylinders (not shown), with combustion cycle control elements for a rightmost four cylinders being shown in FIG. 1. The EEVO module 12 is implemented as a single unit that controls EEVO for a pair of cylinders of the engine 10, such as the rightmost pair of cylinders shown so that a single fluid pressure control valve such as an oil pressure control valve 16 can control engagement and disengagement of the EEVO module 12 for both engine cylinders. Similar EEVO modules 12 are installed at the other pairs of engine cylinders, but the EEVO module 12 for the adjacent pair of engine cylinders is omitted to show the combustion cycle control elements of the engine cylinder. In alternative embodiments, one EEVO module with one oil pressure control valve may be provided for each engine cylinder, or a single EEVO module could have EEVO mechanisms for each engine cylinder of the engine cylinder head 14 so that all the EEVO mechanisms can be engaged and disengaged together by a single oil pressure control valve 16. Other variations of the EEVO module for covering varying numbers of engine cylinders are contemplated.

Each engine cylinder has one or more intake valve assemblies 20 having intake valves 22 (FIG. 2) biased toward closed positions by intake valve springs 24. The intake valve assemblies 20 are moved to open positions when corresponding intake valve rockers 26 rotate about a rocker shaft 28 and apply force through an intake valve bridge 30 to the intake valve assemblies 20. An intake valve cam lobe (not shown) of a camshaft (not shown) disposed in a camshaft bore 32 of the engine cylinder head 14 engages an intake roller 34 to rotate the intake rocker 26 and force open the intake valves 22 during an intake stroke of an engine piston (not shown) of the engine cylinder. In a similar manner, one or more exhaust valve assemblies 40 having exhaust valves 42 and exhaust springs 44 are biased to closed positions and opened by rotation of an exhaust rocker 46 about the rocker shaft 28. The exhaust rocker 46 applies opening force through an exhaust valve bridge 50, an exhaust valve cam lobe (not shown) of the camshaft engages and exhaust roller 54 to open the exhaust valves 42 during an exhaust stroke of the engine piston.

The engine 10 is a diesel engine that uses mechanical fuel injectors to inject atomized diesel fuel into the engine cylinders to ignite the compressed fuel when the engine pistons are approaching or are approximately at top dead center of a compression stroke. The fuel injectors are omitted in FIGS. 1 and 2 to reveal other components of the engine 10, but fuel injector ports 60 in the engine cylinder head 14 are disposed between the intake valve assemblies 20 and the exhaust valve assemblies 40 for each engine cylinder. Forces to actuate the mechanical fuel injectors are provided by injector rockers 66 pivotally mounted on the rocker shaft 28. The injector rockers 66 applies injection force to the mechanical injector when an injector cam (not shown) of the camshaft engages and injector rollers 74 and rotates the injector rocker 66 at the appropriate time near the top of the compression stroke. The injector rocker 66, the injector roller 74 and the injector cam are sized in comparison to the components of the valve assemblies 20, 40 to handle the increased loads require to inject fuel against the high pressures at the top of the compression stroke. It should be noted that while the cam lobes directly engage the rollers 34, 54, 74 to rotate the rockers 26, 46, 66 in the illustrated engine 10, the EEVO module 12 in accordance with the present disclosure may be implemented in engines having other types of mechanical connections between a camshaft and the rockers 26, 46, 66 to convert rotation of the camshaft into rotation of the rockers 26, 46, 66.

For each engine cylinder, the EEVO module 12 has a drive piston section 80 disposed proximate an end of the injector rocker 66 that is raised by the injector cam, and a driven piston section 82 dispose proximate an end of the exhaust rocker 46 that pushes down on the exhaust valve bridge 50 to open the exhaust valves 42. This arrangement allows the EEVO module 12 to convert the movement of the injector rocker 66 into early opening of the exhaust valves 42 after the compression stroke and during an expansion stroke when the EEVO module 12 is engaged as discussed more fully below. In FIG. 2, a portion of the engine cylinder head 14 with the EEVO module 12 is enlarged, and a portion of an EEVO housing 84 is removed to show the internal components of the EEVO module 12 corresponding to the rightmost engine cylinder.

The drive piston section 80 includes a drive piston 90 that will engage the injector rocker 66 when the EEVO module 12 is activated. The drive piston 90 shown in greater detail in FIG. 3 which is a cross-section of the EEVO module 12 and the injector rocker 66 taken along a longitudinal center of the injector rocker 66. The drive piston 90 is disposed within a drive piston bore 92 of the EEVO housing 84 that includes a drive piston bore top wall 94 and a drive piston bore bottom end 96 terminating at a drive piston bore opening 98 through an outer surface of the EEVO housing 84. The drive piston 90 has a drive piston body 100 that is slidable within the drive piston bore 92, and a drive piston shaft 102 having a convex head 104 engaging a concave inner surface 106 of the drive piston body 100. A drive piston end cap 108 is installed at the drive piston bore opening 98 and held in place by a drive piston retention ring 110 to retain the drive piston body 100 and the drive piston bore 92. The drive piston end cap 108 has a central opening 112 allowing an injector rocker engaging tip 114 to extend there through. A drive piston spring 116 having a drive piston spring constant is disposed between a surface of the drive piston shaft 102 and the drive piston end cap 108 to bias the drive piston body 100 and the drive piston shaft 102 toward the drive piston bore top wall 94 when the EEVO module 12 is disengaged as described below.

Figure 3:
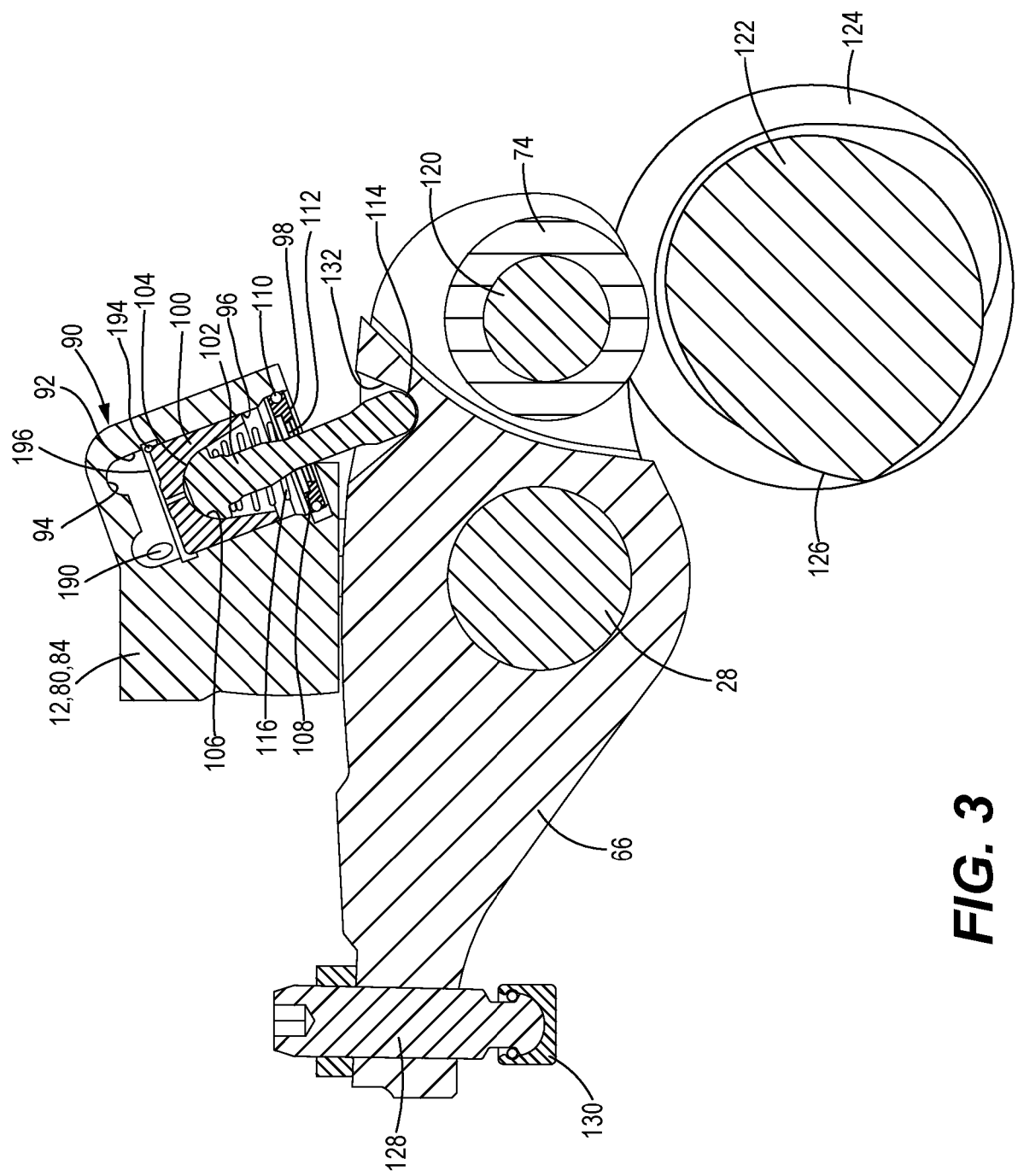
FIG. 3 is a side cross-sectional view of an injector rocker and a camshaft of the engine of FIG. 1 and a drive piston of EEVO module.

The injector rocker 66 is disposed below the drive piston section 80 and rotatably mounted on the rocker shaft 28. The injector roller 74 is rotatably mounted on the injector rocker 66 by an injector roller shaft 120 and is positioned above an injector cam 122 of a camshaft 124. The injector cam 122 has an injector cam lobe 126 that is sized and positioned to engage the injector roller 74 and rotate the injector rocker 66 counterclockwise as shown in FIG. 3 to actuate the fuel injector when the engine piston approaches top dead center of the compression stroke. At an end of the injector rocker 66 opposite the injector roller 74, an injector activating pin 128 is mounted and extends downward below the end of the injector rocker 66 with an injector activating shoe 130 mounted thereon.

The injector rocker 66 is modified to integrate with the drive piston 90. An injector rocker drive cup 132 is cut into a top surface of the injector rocker 66 and is positioned below the drive piston 90 to receive the injector rocker engaging tip 114 when the EEVO module 12 is primed and the drive piston shaft 102 extends through the central opening 112. The injector rocker drive cup 132 has a concave shape that is complementary to a convex shape of the injector rocker engaging tip 114. The shapes, along with the curved shapes of the convex head 104 and the concave inner surface 106 of the drive piston body 100, and the annular space between the drive piston shaft 102 and the central opening 112, provide the drive piston shaft 102 with freedom to move out of alignment with a longitudinal axis of the drive piston bore 92 that may be required when converting rotational movement of the injector rocker 66 into linear movement of the drive piston body 100.

Figure 4:
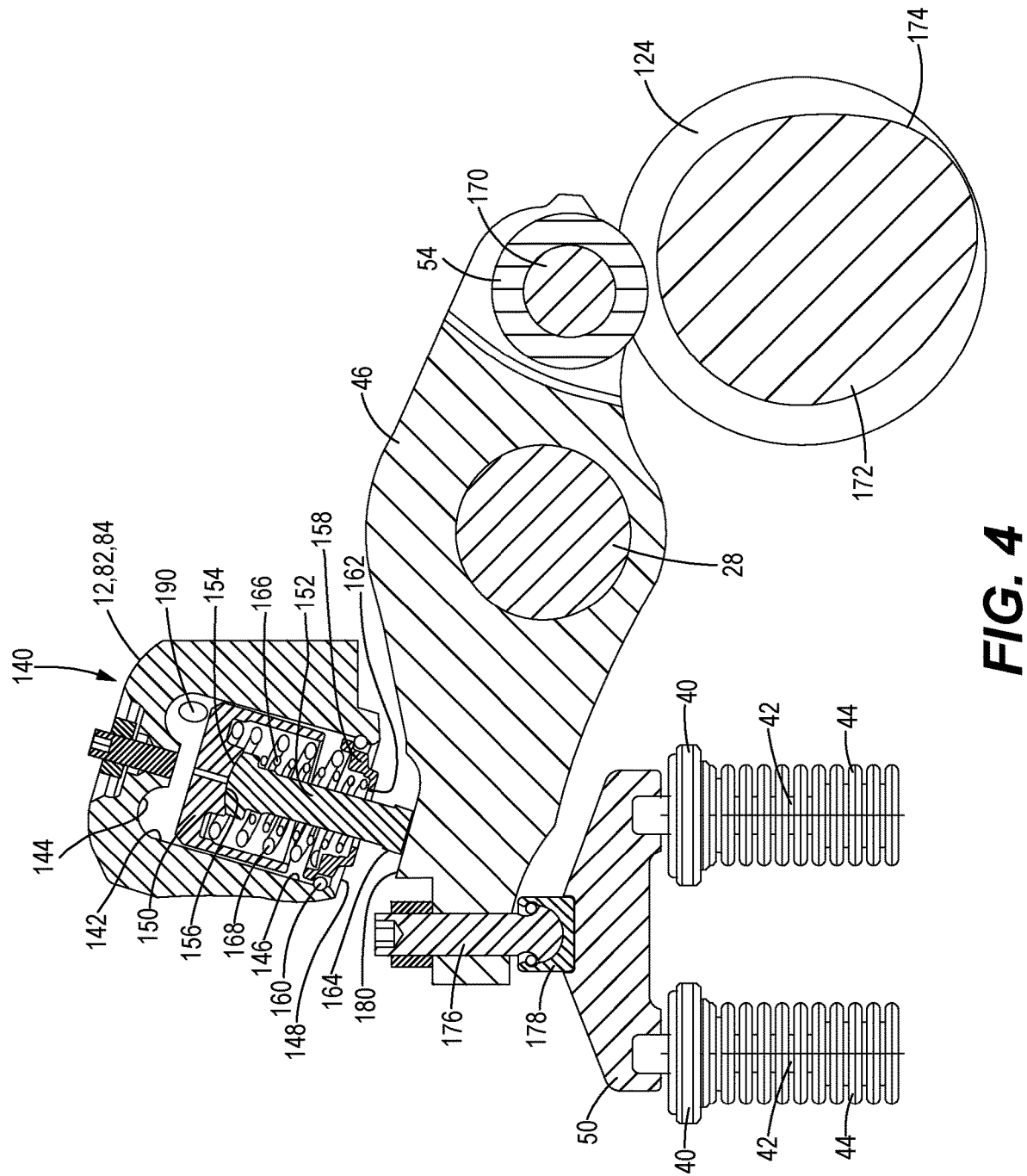
FIG. 4 is a side cross-sectional view of an exhaust rocker and the camshaft of the engine of FIG. 1 and a driven piston of EEVO module.

A driven piston 140 of the driven piston section 82 and the exhaust rocker 46 are shown in greater detail in FIG. 4 which is a cross-section of the EEVO module 12 and the exhaust rocker 46 taken along a longitudinal center of the exhaust rocker 46, and in which other components of the engine 10 are not shown. The driven piston 140 is configured in a similar manner as the drive piston 90, with the driven piston 140 being disposed within a driven piston bore 142 of the EEVO housing 84 having a driven piston bore top wall 144 and a driven piston bore bottom end 146 terminating at a driven piston bore opening 148 through the outer surface of the EEVO housing 84. A driven piston body 150 is slidable within the driven piston bore 142, and a driven piston shaft 152 has a convex head 154 engaging a concave inner surface 156 of the driven piston body 150. A driven piston end cap 158 installed at the driven piston bore opening 148 and held in place by a driven piston retention ring 160 to retain the driven piston body 150 and the driven piston bore 142. The driven piston end cap 158 has a central opening 162 allowing an exhaust rocker engaging tip 164 to extend there through. A driven piston shaft spring 166 having driven piston shaft spring constant is disposed between the driven piston shaft 152 and the driven piston end cap 158, and a driven piston body spring 168 having driven piston body spring constant is disposed between the driven piston body 150 and the driven piston and 158, to bias the driven piston body 150 and the driven piston shaft 152 toward the driven piston bore top wall 144 when the EEVO module 12 is disengaged as described below.

The exhaust rocker 46 is disposed below the driven piston section 82 and rotatably mounted on the rocker shaft 28. The exhaust roller 54 is rotatably mounted on the exhaust rocker 46 by an exhaust roller shaft 170 and is positioned above an exhaust valve cam 172 of the camshaft 124. The exhaust valve cam 172 has an exhaust valve cam lobe 174 that is sized and positioned to engage the exhaust roller 54 and rotate the exhaust rocker 46 counterclockwise as shown in FIG. 4 to open the exhaust valves 42 during an exhaust stroke of the engine piston. At an end of the exhaust rocker 46 opposite the exhaust roller 54, an exhaust valve activating pin 176 is mounted and extends downward below the end of the exhaust rocker 46 with an exhaust valve activating shoe 178 mounted thereon.

The exhaust rocker 46 is modified to integrate with the driven piston 140. An exhaust rocker driven surface 180 is formed on a top surface of the exhaust rocker 46 and is positioned below the driven piston 140 to be engaged by the exhaust rocker engaging tip 164 when the EEVO module 12 is primed and the driven piston shaft 152 extends through the central opening 162. The exhaust rocker driven surface 180 is flat to match the exhaust rocker engaging tip 164. The complementary curved surfaces of the convex head 154 and the concave inner surface 156 of the driven piston body 150 and the annular space between the driven piston shaft 152 and the central opening 162 provide the driven piston shaft 152 with freedom to move out of alignment with a longitudinal axis of the driven piston bore 142 that may be required when converting linear movement of the driven piston body 150 into rotational movement of the exhaust rocker 46.

Returning to FIG. 2, additional fluid passages and ports are defined within the EEVO housing 84 for facilitating engagement of the EEVO module 12 and its operation in opening the exhaust valves 42 at the appropriate times. An activation fluid passage 190 extends between the drive piston bore 92 and the driven piston bore 142, and intersects the piston bores 92, 142 proximate the piston bore top walls 94, 144, thereby placing a volume of the drive piston bore 92 between the drive piston bore top wall 94 and the drive piston body 100 in fluid communication with a volume of the driven piston bore 142 between the driven piston bore top wall 144 and the driven piston body 150. The activation fluid passage 190 will have an activation fluid passage pressure $P_{AFP}$ that acts against the piston springs 116, 166, 168 to try to force the piston bodies 100, 150 toward the piston bore openings 98, 148.

Pressurized fluid is supplied to the activation fluid passage 190 via a fluid supply passage 192 that places a fluid inlet port (not shown) of the EEVO housing 84 in fluid communication with the activation fluid passage 190. The fluid inlet port is fluidly connected to the oil pressure control valve 16 for the EEVO module 12. The oil pressure control valve 16 can be actuated to provide pressurized fluid to the activation fluid passage 190 and prime the EEVO module 12 for engagement with the exhaust rocker 46 and the injector rocker 66 and execution of EEVO as described below. The oil pressure control valve 16 can also be opened to drain the fluid from the activation fluid passage 190 to a low pressure reservoir (not shown) of the engine 10 when the EEVO module is disengaged.

To control the timing of the EEVO of the exhaust valves 42, a spill passage 194 intersects the drive piston bore 92 at an annular groove 196 between the drive piston bore top wall 94 and the drive piston bore bottom end 96. The spill passage 194 may extend to a fluid drain port (not shown) that is in fluid communication with the low pressure reservoir. A low pressure timing valve 198 is disposed within the spill passage 194 and controls the flow of fluid from the drive piston bore 92 to the fluid drain port and the low pressure reservoir. The low pressure timing valve 198 is biased toward the drive piston bore 92, and has a timing valve release pressure $P_{TV}$ at which the low pressure timing valve 198 will open to drain pressurized fluid to the fluid drain port. The annular groove 196 is positioned in the drive piston bore 92 between the drive piston bore top wall 94 and the drive piston bore bottom end 96 at a position where the drive piston body 100 will alternately open and close the annular groove 196 and, correspondingly, the spill passage 194 when the drive piston body 100 moves within the drive piston bore 92 as described more fully below.

Situations can occur where pressures can be created that could cause damage to the EEVO module 12 and the associated components of the engine 10. For example, excess fuel could be added to the engine cylinder, thereby creating more combustion energy and more pressure in the engine cylinder when the EEVO module 12 attempts to open the exhaust valve 42 after the compression stroke. The increased pressure can drive high loads into the EEVO module 12 and the engine components that risk cracking the EEVO housing 84, bending the exhaust valve bridge 50, or causing other damage to the components. Similar risk exist if the ignition timing is off. The EEVO module 12 can be protected from these risks by providing a high pressure relief passage 200 extending from the activation fluid passage 190 to the fluid drain port, and having a high pressure relief valve 202 disposed therein. The high pressure relief valve 202 is biased toward the activation fluid passage 190, and has a relief valve release pressure $P_{RV}$ that is greater than an exhaust valve displacement pressure $P_{EVD}$ in which the engaged EEVO module 12 can open the exhaust valves 42 under normal operating conditions, but less than a pressure that could cause damage. When the actuation fluid passage pressure $P_{AFP}$ exceeds the relief valve release pressure $P_{RV}$, the high pressure relief valve 202 will open to drain the high pressure fluid through the fluid drain port to the low pressure reservoir.

Figure 5:
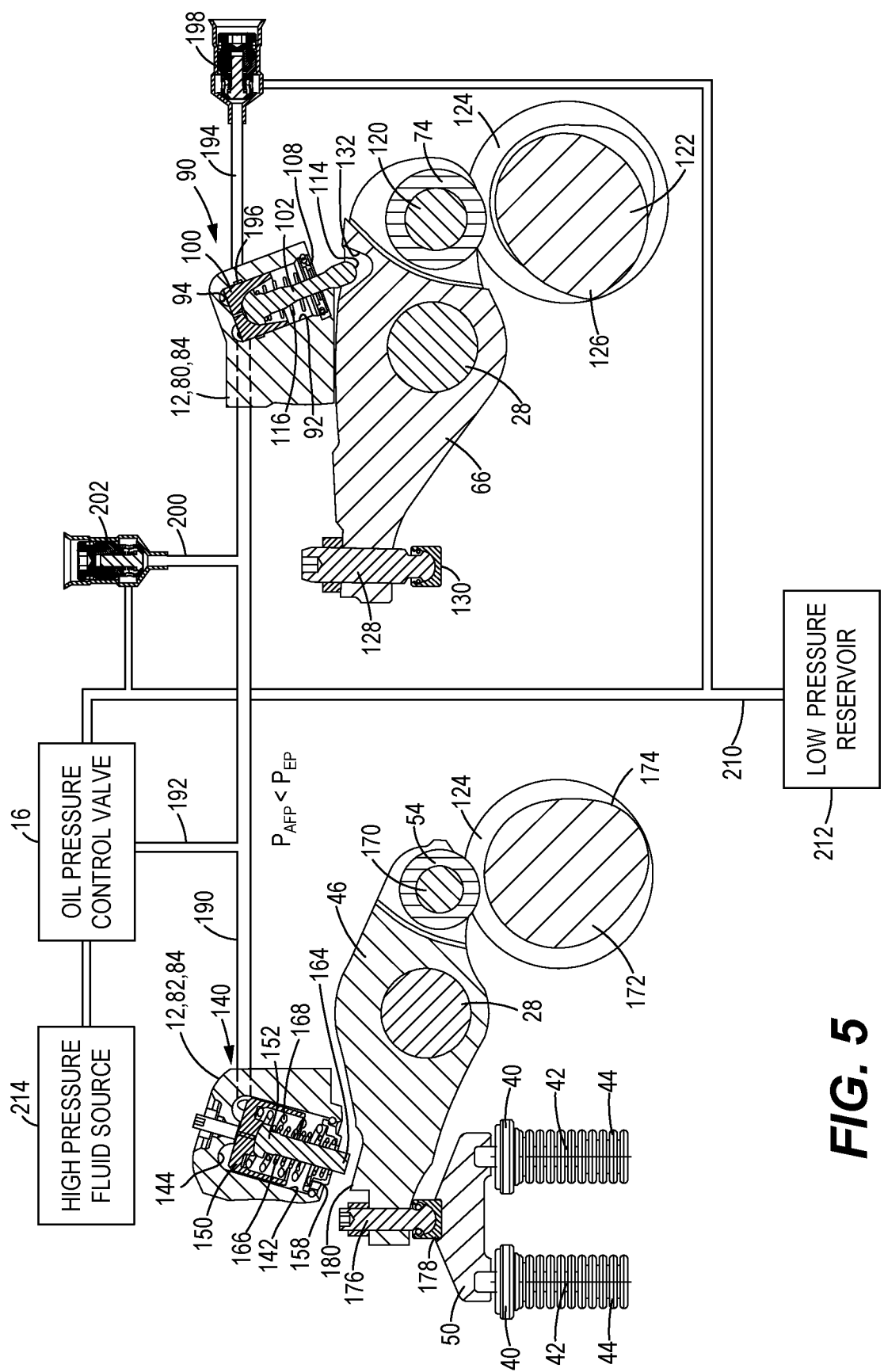
FIG. 5 is a schematic illustration of the injector rocker, the exhaust rocker and the camshaft of the engine of FIG. 1 and the components of the EEVO module in a disengaged position.

The sequence of engaging the EEVO module 12 and performing EEVO is illustrated schematically in FIGS. 5-9. Referring to FIG. 5, the EEVO module 12 is shown disengaged from the exhaust rocker 46 and the injector rocker 66. The oil pressure control valve 16 has been opened to drain fluid from the activation fluid passage 190 through a fluid drain port 210 to a low pressure reservoir 212 and reduce the activation fluid passage pressure $P_{AFP}$ so that the piston springs 116, 166, 168 force the piston bodies 100, 150 to the piston bore top walls 94, 144. The piston shafts 102, 152 are retracted into the piston bores 92, 142 to prevent engagement with the injector rocker 66 and the exhaust rocker 46, respectively, as they are lifted by the cams 122, 172 while the engine 10 is running. When the EEVO module 12 is to be engaged to perform EEVO, the oil pressure control valve 16 is actuated to inject pressurize fluid from a high pressure fluid source 214 into the activation fluid passage 190. As the activation fluid passage pressure $P_{AFP}$ increases, the pressure force eventually overcomes the spring forces, and the piston bodies 100, 150 move toward the piston bore bottom ends 96, 146 to the positions shown in FIG. 6. In some embodiments, the drive piston spring constant of the drive piston spring 116 is less than a combined driven piston spring constant of the spring constants of the driven piston springs 166, 168 so the drive piston body 100 can begin to move at a lower activation fluid valve pressure $P_{AFP}$ and the drive piston shaft 102 will impact the injector rocker 66 in the injector rocker drive cup 132 with a relatively low velocity and will not slam home. The driven piston body 150 and the driven piston shaft 152 move later under a higher activation fluid passage pressure $P_{AFP}$, but the exhaust rocker engaging tip 164 is only a short distance away from the exhaust rocker driven surface 180 when disengaged, so the closing velocity at contact is low.

As a drive piston body 100 moves toward the drive piston bore bottom end 96 and the engaged position, the drive piston body 100 will move past that the annular groove 196 and open the spill passage 194 to the drive piston bore 92 and to the activation fluid passage pressure $P_{AFP}$. The point at which the spill passage 194 is opened and closed may be controlled by the position and size of the annular groove 196 in the drive piston bore 92. The annular groove 196 can be extended toward the drive piston bore top wall 94 to keep the spill passage 194 open longer, or shifted toward the drive piston bore bottom end 96 to close the spill passage 194 sooner when the drive piston body 100 begins to move back toward the drive piston bore top wall 94. The oil pressure control valve 16 will continue to pump pressurize fluid into the activation fluid passage 190 until the actuation fluid passage pressure $P_{AFP}$ is at least equal to a predetermined EEVO priming pressure $P_{EP}$ that is sufficient for the piston shafts 102, 152 to engage the injector rocker 66 and the exhaust rocker 46, respectively, while not exceeding the timing valve release pressure $P_{TV}$ and causing the low pressure timing valve 198 to open and drain pressurized fluid.

Figure 7:
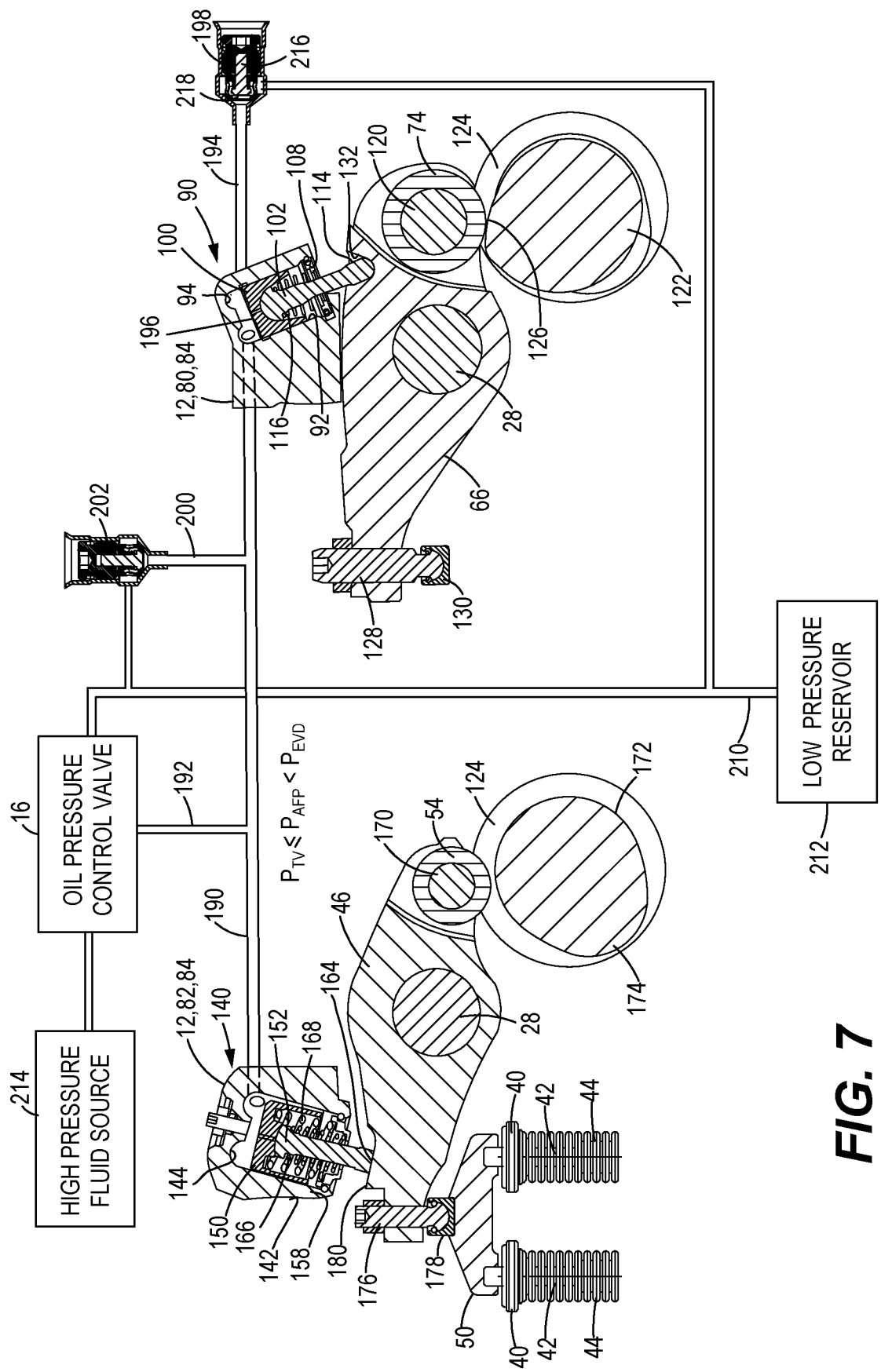
FIG. 7 is the schematic illustration of FIG. 5 with the components of the EEVO module in the engaged position and the injector rocker moving the drive piston before the driven piston moves.

With the EEVO module 12 engaged, the EEVO module 12 will respond to movement of the injector rocker 66 caused by the injector cam 122. In FIG. 7, the engine piston is approximately at top dead center of the compression stroke, and the injector cam 122 has rotated to a position where the injector cam lobe 126 is engaging the injector roller 74 and rotating the injector rocker 66 to cause the fuel injector to inject atomized fuel into the engine cylinder. The rotation of the injector rocker 66 forces the drive piston body 100 toward the drive piston bore top wall 94 against the force of the activation fluid passage pressure $P_{AFP}$. During this initial movement of the drive piston body 100, the annular groove 196 is not covered and the spill passage 194 is open, and the low pressure timing valve 198 is exposed to the activation fluid passage pressure $P_{AFP}$.

The drive piston body 100 compresses the pressurized fluid and causes the actuation fluid passage pressure $P_{AFP}$ to increase. At the illustrated position, the actuation fluid passage pressure $P_{AFP}$ is at least equal to the timing valve release pressure $P_{TV}$, causing a timing valve shaft 216 to unseat from a timing valve seat 218 to allow pressurized fluid to drain through the fluid drain port 210 to the low pressure reservoir 212. The low pressure timing valve 198 will remain open and drain fluid until the drive piston body 100 covers the annular groove 196 and isolates the spill passage 194 from the actuation fluid passage pressure $P_{AFP}$. The exhaust valve displacement pressure $P_{EVD}$ is greater than the timing valve release pressure $P_{TV}$, so the driven piston body 150 will not displace to rotate the exhaust rocker 46 until after the drive piston body 100 covers the annular groove 196 and closes the spill passage 194.

After the drive piston body 100 closes the spill passage 194, further movement of the drive piston body 100 increases the actuation fluid passage pressure $P_{AFP}$. Eventually, the actuation fluid passage pressure $P_{AFP}$ is approximately equal to the exhaust valve displacement pressure $P_{EVD}$ and the driven piston body 150 begins to move toward the driven piston bore bottom end 146. At this point in the combustion cycle, the drive piston 90 and the driven piston 140 function together to act like a rocker converting the rotation of the injector cam 122 into displacement of the exhaust valves 42. In one embodiment, when the actuation fluid passage pressure $P_{AFP}$ reaches the exhaust valve displacement pressure $P_{EVD}$, the driven piston body 150 displaces in the driven piston bore 142 and the exhaust valve 42 begins to open at a position that equates to the engine piston moving to approximately 40° past top dead center of the combustion stroke. The drive piston body 100 continues to move toward the drive piston bore top wall 94 and cause the driven piston body 150 to open the exhaust valves 42 further until the position shown in FIG. 8 where an apex of the injector cam lobe 126 engages the injector roller 74.

As the injector cam 122 rotates further, the injector rocker 66 rotates back in the clockwise direction, allowing the actuation fluid passage pressure $P_{AFP}$ to force the drive piston body 100 back toward the drive piston bore bottom end 96. The actuation fluid passage pressure $P_{AFP}$ eventually drops below the exhaust valve displacement pressure $P_{EVD}$ and the exhaust valve assemblies 40 and the pressure in the engine cylinder force the driven piston body 150 toward the driven piston bore top wall 144. Eventually, the exhaust valve cam 172 rotates into engagement with the exhaust roller 54 to open the exhaust valves 42 during the exhaust stroke of the engine piston. Also during the time in which the EEVO module 12 is engaged as shown in FIGS. 6-8, the high pressure relief valve 202 will open to drain fluid and relieve pressure when an overpressure situation exists and the actuation fluid passage pressure $P_{AFP}$ is greater than the relief valve release pressure $P_{RV}$.

Figure 6:
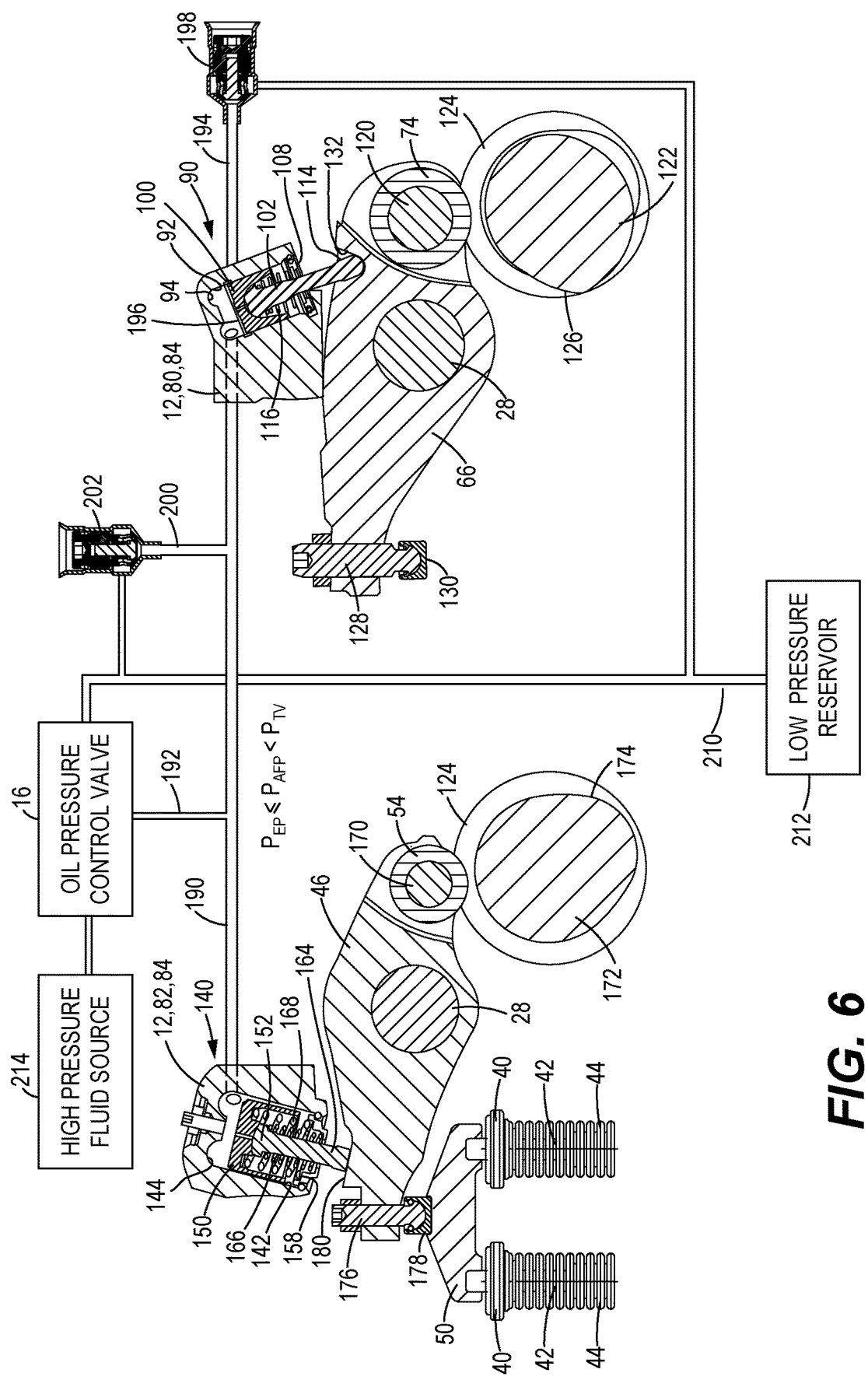
FIG. 6 is the schematic illustration of FIG. 5 with the components of the EEVO module in an engaged position.
Figure 8:
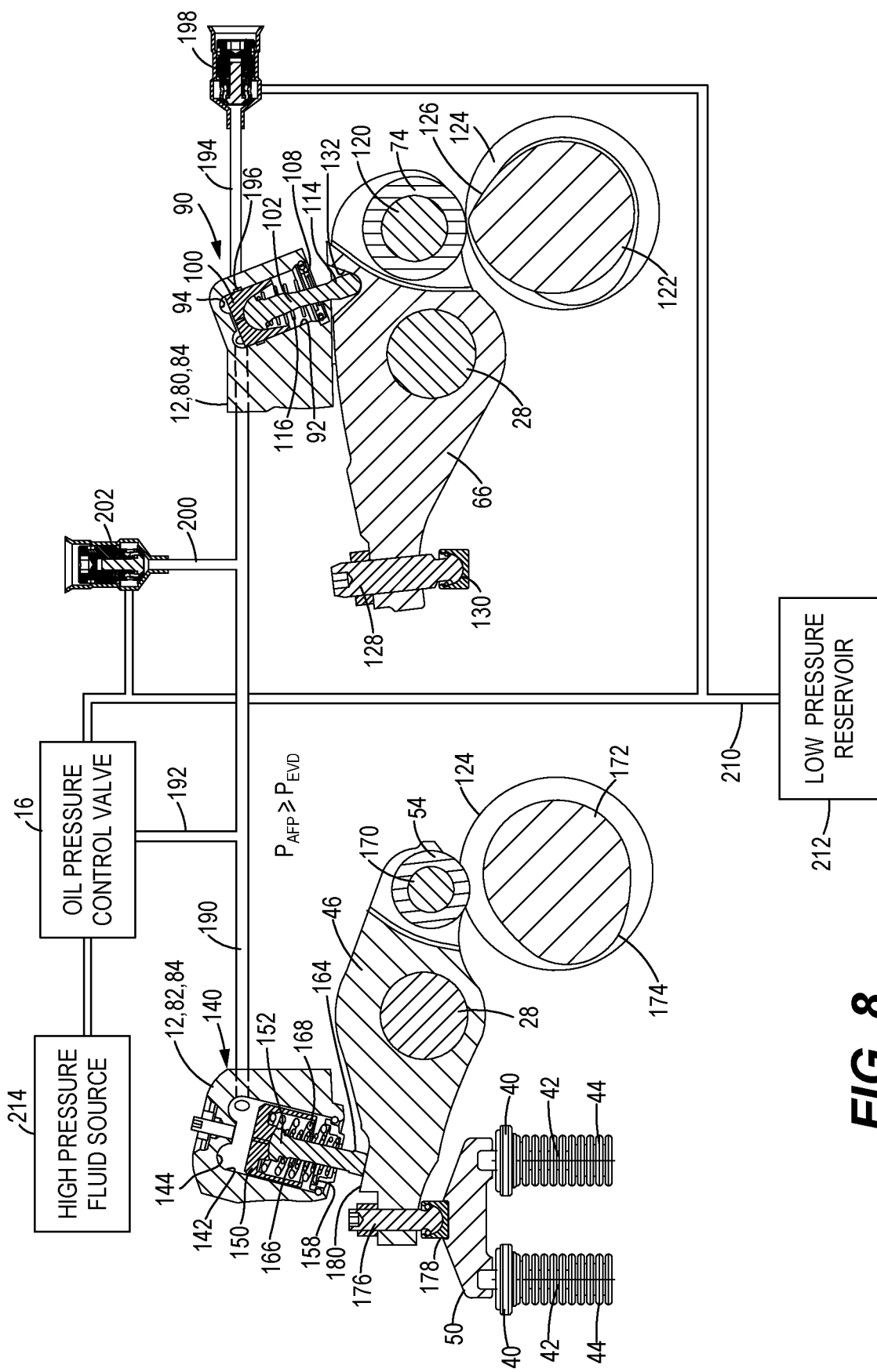
FIG. 8 is the schematic illustration of FIG. 5 with the components of the EEVO module in the engaged position, the injector rocker moving the drive piston and the driven piston moving the exhaust rocker to open exhaust valves.

The sequence of FIGS. 6-8 will be repeated during every combustion cycle of the engine cylinder as long as the EEVO module 12 is engaged. When conditions or operator commands indicate that EEVO no longer should or needs to be performed, the oil pressure control valve 16 is deactivated and connects the activation fluid passage 190 to the low pressure reservoir 212 to drain the pressurized fluid from the activation fluid passage 190. When the actuation fluid passage pressure $P_{AFP}$ drops below the EEVO priming pressure $P_{EP}$, the piston bodies 100, 150 under the biasing forces of the piston springs 116, 166, 168 will displace back to the disengaged positions of FIG. 5.

Figure 9:
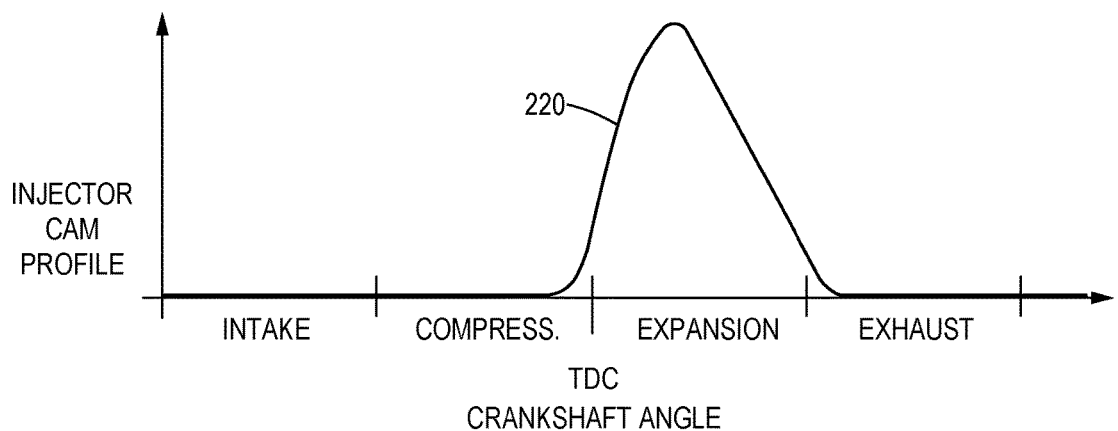
FIG. 9 is a graph of an injector cam profile versus a crankshaft angle for the engine of FIG. 1.
Figure 10:
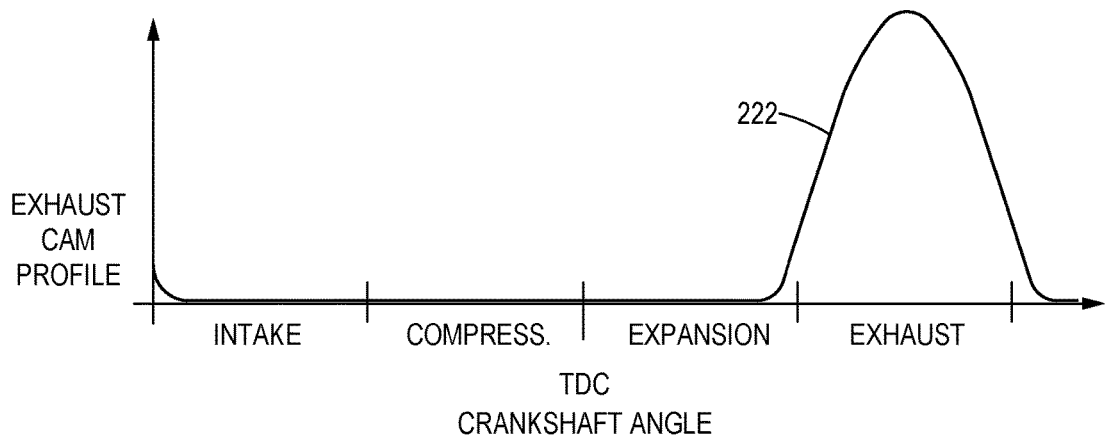
FIG. 10 is a graph of an exhaust cam profile versus the crankshaft angle for the engine of FIG. 1.

FIGS. 9-13 graphically illustrate the profiles of the injector cam 122 and the exhaust valve cam 172, and displacement profiles of the exhaust valves 42 during the combustion cycle for different operating modes of the EEVO module 12. FIG. 9 is a graph of an exhaust cam profile versus a crankshaft angle of the engine crankshaft. The crankshaft angle is divided into intake, compression, expansion and exhaust strokes of the combustion cycle representing 180° increments of the 720° total crankshaft rotation during the combustion cycle, while the camshaft 124 makes one 360° rotation per combustion cycle. An injector cam profile 220 is constant for the intake stroke and the majority of the compression stroke. As the engine piston approaches top dead center of the compression stroke, the injector cam profile 220 reaches the injector cam lobe 126 and begins to engage the injector roller 74 to cause the fuel injector to inject fuel into the engine cylinder. The injector cam lobe 126 as configured in the illustrated embodiment has a relatively steep increase at the beginning of the expansion stroke where the fuel is injected, and then a steady decrease to the end of the expansion stroke where the injector cam 122 disengages from the injector roller 74. An exhaust cam profile 222 shown in FIG. 10 may have a generally similar shape as the injector cam profile 220 that is shifted by 180° of crankshaft rotation into the exhaust stroke. However, the exhaust valve cam lobe 174 is more symmetrical than the injector cam lobe 126, and the exhaust cam profile 222 is correspondingly more symmetrical within the exhaust stroke.

Figure 11:
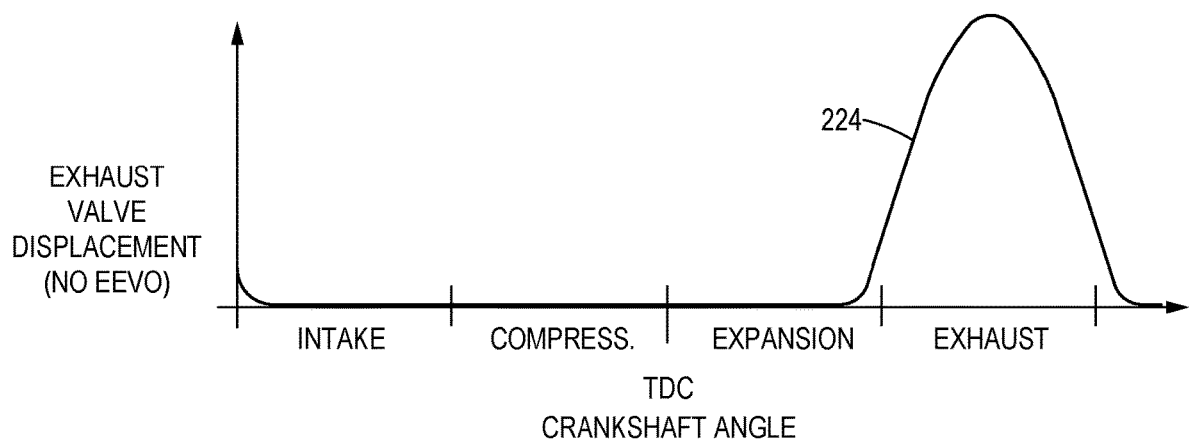
FIG. 11 is a graph of an exhaust valve displacement versus the crankshaft angle for the engine of FIG. 1 when the EEVO module is disengaged.

An exhaust valve displacement profile 224 for the exhaust valves 42 when the EEVO module 12 is disengaged as shown in FIG. 11. The exhaust valve displacement profile 224 represents operation of the engine 10 under the generator load when the engine 10 is engaged in an emergency situation. When the EEVO module 12 is disengaged, the injector cam 122 will have no influence on the displacement of the exhaust valves 42. Consequently, the exhaust valve displacement profile 224 will generally track the exhaust cam profile 222 through the exhaust stroke.

Figure 12:
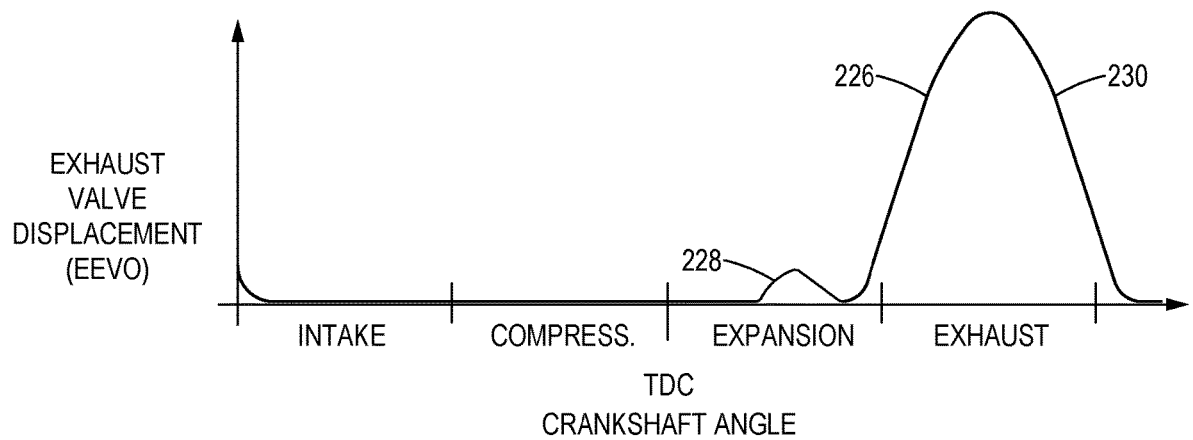
FIG. 12 is a graph of the exhaust valve displacement versus the crankshaft angle for the engine of FIG. 1 when the EEVO module is engaged.

The injector cam 122 will have an effect on the displacement of the exhaust valves 42 when the EEVO module 12 is engaged and operates as described above in relation to FIGS. 6-8. FIG. 12 illustrates an exhaust valve displacement profile 226 for the exhaust valves 42 when the EEVO module 12 is engaged. The exhaust valve displacement profile 226 is similar to the exhaust valve displacement profile 224 until the end of the compression stroke. The injector cam 122 begins rotating the injector rocker 66 as indicated by injector cam profile 220 of FIG. 9. However, initially the rotation of the injector rocker 66 is not converted into displacement of the exhaust valves 42 due to the low pressure timing valve 198 draining fluid to the low pressure reservoir. Once the annular groove 196 is covered and the spill passage 194 is closed by the drive piston body 100, and the activation fluid passage pressure $P_{AFP}$ increases to the exhaust valve displacement pressure $P_{EVD}$, the exhaust valve displacement profile 226 enters and EEVO portion 228 where the driven piston body 150 displaces to open the exhaust valves 42 and release exhaust energy. The EEVO portion 228 will track the injector cam profile 220 through the expansion stroke until the EEVO portion 228 transitions to an exhaust cam portion 230 where the exhaust valve cam 172 takes over control of the displacement of the exhaust valves 42 in a similar manner as shown in the exhaust valve displacement profile 224 of FIG. 11.

In some implementations, it may be desirable to provide an alternative embodiment of the EEVO module 12 having an additional mode for the engine 10 to function as a compression brake. Providing both EEVO and compression braking may be desirable where the engine 10 is installed in a machine or vehicle that requires the engine 10 to operate at an elevated engine speed when not being subjected to a load (EEVO mode) and to provide a retarding force during braking, coasting downhill or other situations (compression braking mode). In the compression braking mode, the delay in opening the exhaust valves 42 provided by the low pressure timing valve 198 may be eliminated so that any movement of the injector rocker 66 will cause corresponding displacement to open the exhaust valves 42. In one embodiment, a controllable shutoff valve may be installed in the spill passage 194 upstream of the low pressure timing valve 198 to prevent drainage through the spill passage 194 when the shutoff valve is closed. In other embodiments, the low pressure timing valve 198 may be an electro-mechanical valve capable of being locked in the closed position or unlocked to perform as described above to drain fluid and delay displacement of the driven piston body 150 and opening of the exhaust valves 42. In further embodiments, the spill passage 194 and the low pressure timing valve 198 may be omitted and replaced by a smart valve disposed within a passage from the activation fluid passage 190 to the fluid drain port 210. The smart valve may be configured to be closed during the compression brake mode, and to be opened during the EEVO mode up to the point of the rotation of the injector rocker 66 and the displacement of the drive piston body 100 where the smart valve should be closed so that the driven piston body 150 will displaced. The time to close the smart valve may be triggered by the position of the injector rocker 66 or the drive piston body 100, the rotation of the crankshaft or the camshaft 124, or other indicators of a point within the combustion cycle.

Figure 13:
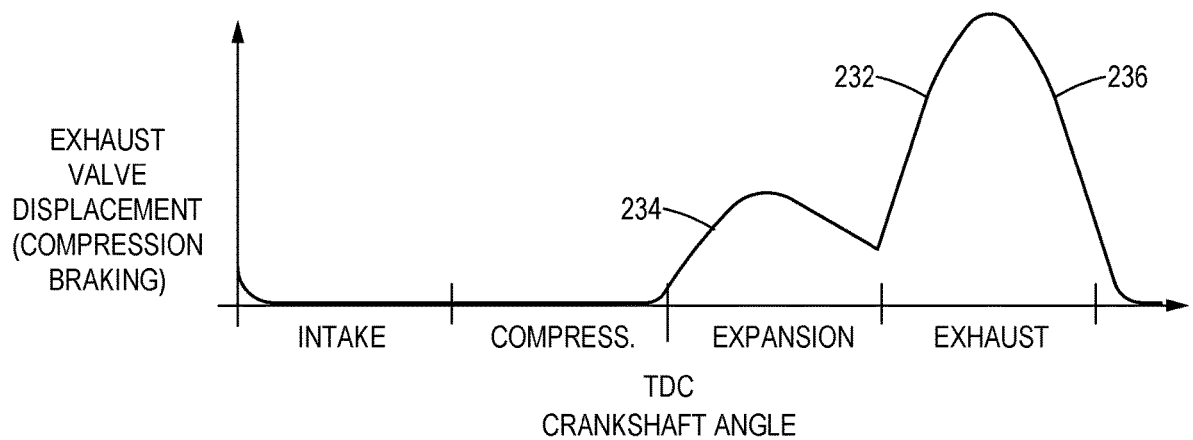
FIG. 13 is a graph of the exhaust valve displacement versus the crankshaft angle for the engine of FIG. 1 when an alternative embodiment of an EEVO module capable of providing compression braking is engaged.
Figure 14:
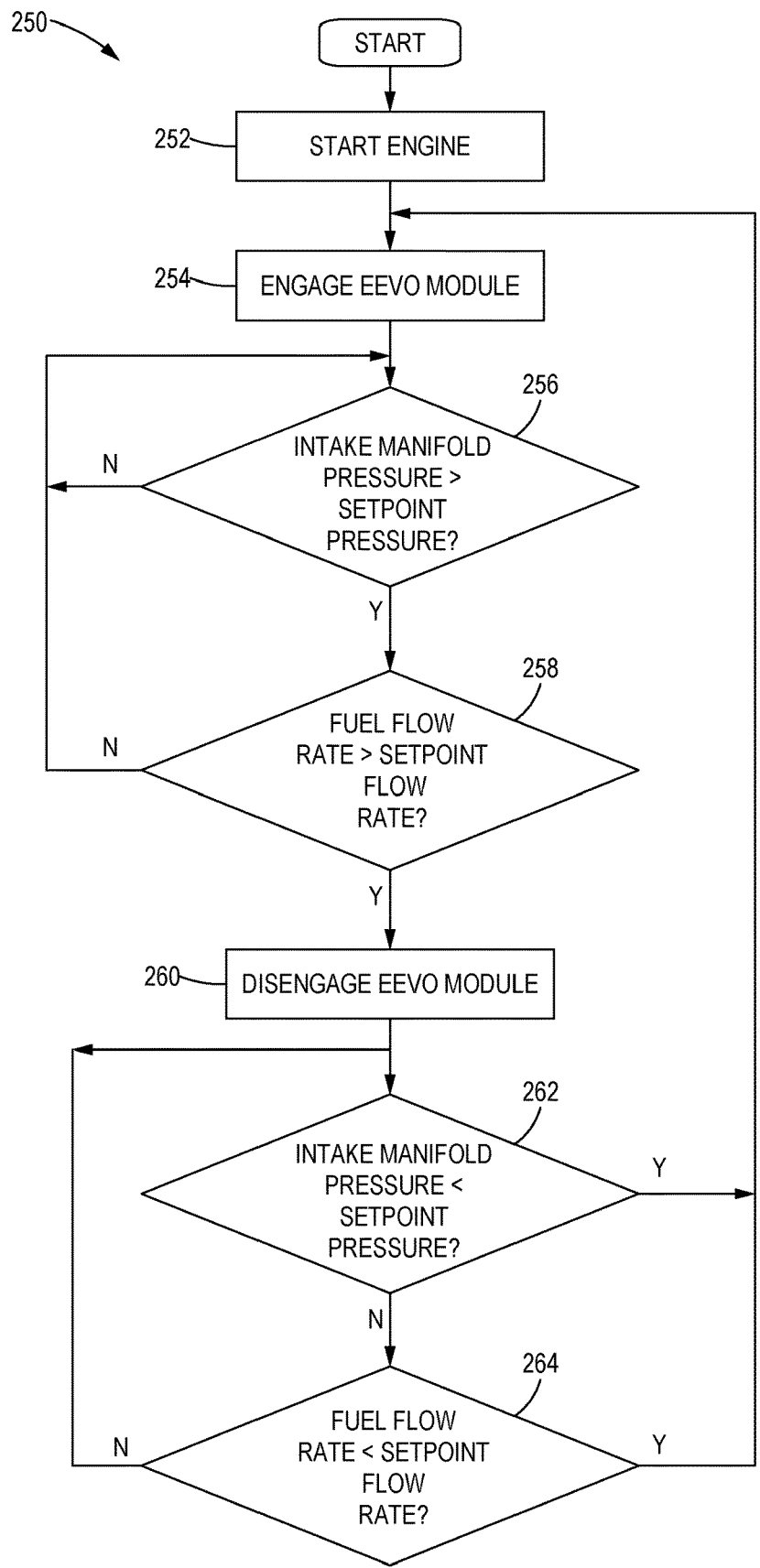
FIG. 14 is a flow diagram of an EEVO control routine in accordance with the present disclosure for the EEVO module.

FIG. 13 illustrates an exhaust valve displacement profile 232 for the exhaust valves 42 when the EEVO module 12 is in a compression brake mode. The exhaust valve displacement profile 232 is similar to the exhaust valve displacement profile 226, but with a compression braking portion 234 of the exhaust valve displacement profile 232 indicating that displacement of the exhaust valves 42 begins when the engine piston is approaching top dead center of the compression stroke. The rotation of the injector rocker 66 is converted into displacement of the exhaust valves 42 as soon as the displacement of the drive piston body 100 increases the activation fluid passage pressure $P_{AFP}$ to the exhaust valve displacement pressure $P_{EVD}$ since the low pressure timing valve 198 does not drain fluid and maintain the activation fluid passage pressure $P_{AFP}$ at the timing valve release pressure $P_{TV}$. The compression braking portion 234 more closely tracks the injector cam profile 220 through the expansion stroke than the EEVO portion 228 of FIG. 12, and eventually transitions to an exhaust cam portion 236 as the engine piston approaches the bottom of the expansion stroke.

INDUSTRIAL APPLICABILITY

The EEVO module 12 and the manner of executing EEVO in accordance with the present disclosure utilizes existing injector cam load profiles to drive the exhaust rocker 46 and open the exhaust valves 42. EEVO and compression release systems such as those taught in the Peters et al. and the Ernest et al. patents require additional exhaust cams, or modifying exhaust cam profiles for early opening of exhaust valves. The present system takes advantage of the injector cam lobe already being timed correctly to act like an extra lobe on the early exhaust valve opening cams in known EEVO systems. The present system may be preferable to known systems because no cam modifications are required, and the injector rocker 66, the injector roller 74 and the injector cam 122 are sized to take more load than the intake and exhaust rockers 26, 46, rollers 34, 54 and cams because the mechanical fuel injector injects fuel against the pressure in the engine cylinder when the engine piston is at top dead center of the compression stroke. The existing robustness of the injector components is used to advantage to power the exhaust valves 42 open against the cylinder compression pressure.

It may only be necessary to perform EEVO when the engine 10 has insufficient fuel flow and/or the turbocharger is not spooled up with a sufficient pressure for a seamless transient response and cutover to driving an actual load. Consequently, engagement and disengagement of the EEVO module 12 may be controlled by an EEVO control routine 250 when the engine 10 is in a no load backup state. The routine 250 may begin at a block 252 where the engine 10 is started by an operator. After initial startup of the engine 10 at the block 252, control may pass to a block 254 where the EEVO module 12 is engaged to make the engine governor think that the engine 10 has a load, warm up the engine 10 and spool up the turbocharger. An electronic control module (ECM) of the engine 10 may detect the initial startup of the engine 10 and transmit control signals to the oil pressure control valve 16 to discharge pressurized fluid from the high pressure fluid source 214 to the activation fluid passage 190 and prime the EEVO module 12. Once the activation fluid passage pressure $P_{AFP}$ reaches the EEVO priming pressure $P_{EP}$, the EEVO module 12 will execute EEVO to increase the fuel flow rate and the intake manifold pressure as discussed above.

As the engine 10 operates with the EEVO module 12 engaged, control passes to a block 256 where the ECM evaluates an intake manifold pressure to determine whether the intake manifold has reached a predetermined setpoint pressure that is sufficient for the turbocharger to be ready for a cut over to driving a load. The ECM may be operatively connected to an intake manifold pressure sensor in the intake manifold to receive intake manifold pressure sensor signals having values corresponding to a current intake manifold pressure. If the ECM determines that the current intake manifold pressure is less than the setpoint pressure at the block 256, the turbocharger may not be ready for the cutover transient event. Control may pass back to the block 256 to continue evaluating the current intake manifold pressure until the current intake manifold pressure is greater than the setpoint pressure. When the ECM determines that the current intake pressure is greater than the setpoint pressure at the block 256, control may pass to a block 258 where the ECM compares the fuel flow rate provided by the fuel injectors into the engine cylinders to a predetermined setpoint flow rate to determine if sufficient power can be produced to drive the load at cutover. The ECM may estimate a current fuel flow rate into the engine cylinders from the fuel injectors based on the current operating conditions within the engine 10. If the ECM determines that the current fuel flow rate is not greater than the setpoint flow rate at the block 258, control may pass back to the block 256 so the ECM can continue monitoring the intake manifold pressure and the fuel flow rate as EEVO is still being performed by the EEVO module 12.

If the ECM determines that the current intake manifold pressure is greater than the setpoint pressure at the block 256 and that the current fuel flow rate is greater than the setpoint flow rate at the block 258, control may pass to a block 260 where the ECM may disengage the EEVO module 12 by causing the oil pressure control valve 16 to cease discharging pressurized fluid and drain the pressurized fluid from the activation fluid passage 190 to the low pressure reservoir 212. After the EEVO module 12 is disengaged at the block 260, it is possible for the intake manifold pressure and/or the fuel flow rate to drop below the setpoint pressure and/or the setpoint flow rate, respectively, and the engine 10 is no longer ready for a seamless cutover transient response. Therefore, after the EEVO module 12 is disengaged, control may pass to a block 262 where the ECM evaluates whether the intake manifold pressure has fallen below the setpoint pressure. If the intake manifold pressure is less than the setpoint pressure, control may pass back to the block 254 where the ECM will transmit control signals to the oil pressure control valve 16 to prime and reengage the EEVO module 12. If the intake manifold pressure is still greater than the setpoint pressure at the block 262, control may pass to a block 264 where the ECM evaluates whether the current fuel flow rate has dropped below the setpoint flow rate. If the current fuel flow rate is less than the setpoint flow rate, control passes back to the block 254 to reengage the EEVO module 12 and perform EEVO until the intake manifold pressure is again greater than the setpoint pressure at the block 256 and the fuel flow rate is again greater than the setpoint flow rate at the block 258. If the current fuel flow rate is greater than the setpoint flow rate at the block 264, the engine 10 is still ready for a seamless cutover, and control passes back to the block 262 to continue evaluating whether the engine 10 is ready to drive the load if necessary.

Figure 15:
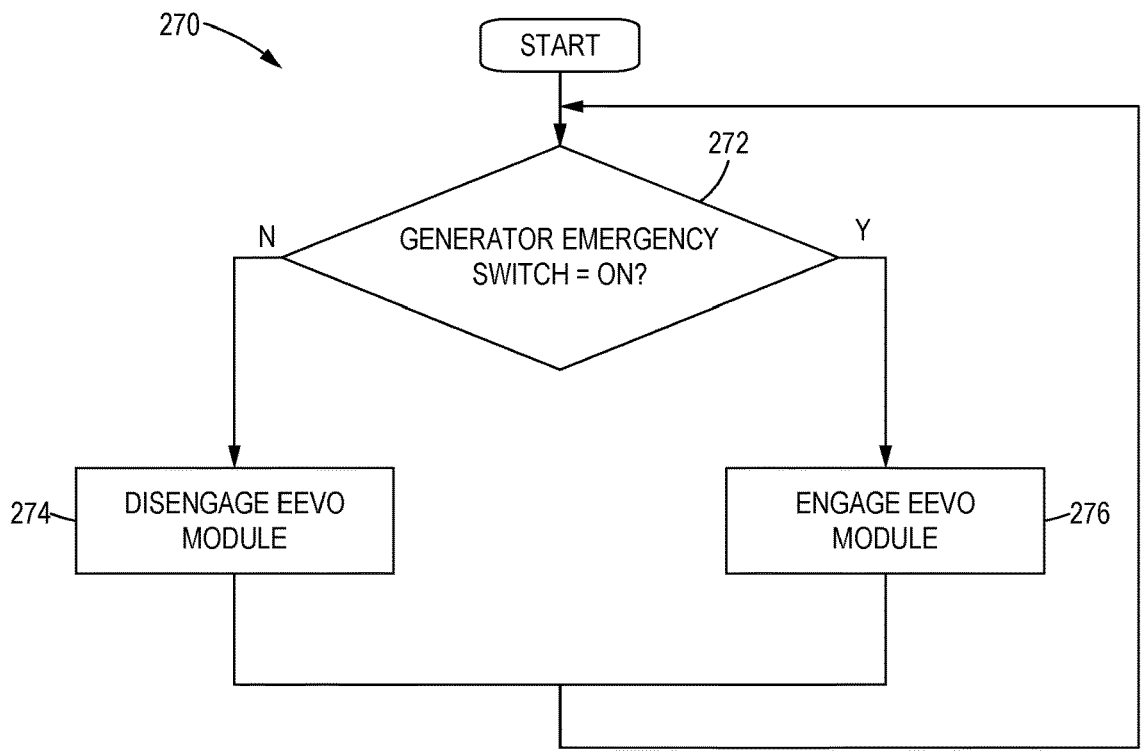
FIG. 15 is a flow diagram of a generator emergency control routine in accordance with the present disclosure for the EEVO module.

At the same time the EEVO control routine 250 is executing, the ECM is monitoring whether the engine 10 is going to cutover from having no load to driving a load such as a generator load. In some implementations, the cutover may be triggered automatically based on a failure of the primary power source. The primary power source could be configured to transmit an emergency signal to the ECM of the engine 10 at the point of failure, or the ECM of the engine 10 may monitor the condition of the primary power source to determine if a failure has occurred or is imminent. In other implementations, the cutover may be manually controlled by an operator via an input device such as a generator emergency switch. FIG. 15 illustrates a generator emergency control routine 270 that may be implemented at the engine 10 to evaluate the operator input. The routine 270 may begin at a block 272 where the ECM may evaluate the position of a generator emergency switch. If the ECM determines that the generator emergency switch is in an "ON" position, control may pass to a block 274 where the ECM transmits control signals to the oil pressure control valve 16 to disengage the EEVO module 12. At the same time, the ECM may discontinue executing the EEVO control routine 250. After the EEVO module 12 is disengaged, control may pass back to the block 272 to continue monitoring the position of the generator emergency switch. If the ECM determines that the generator emergency switch is not in the "ON" position, and that a cutover is not going to occur and the engine 10 will remain in the backup mode, control may pass to a block 276 with the ECM may cause the oil pressure control valve 16 to engage the EEVO module 12 if it is not already engage, or to maintain the engagement of the EEVO module 12. The ECM will also begin to execute or continue executing the EEVO control routine 250. Control may then pass back to the block 272 to continue monitoring the position of the generator emergency switch.

Figure 16:
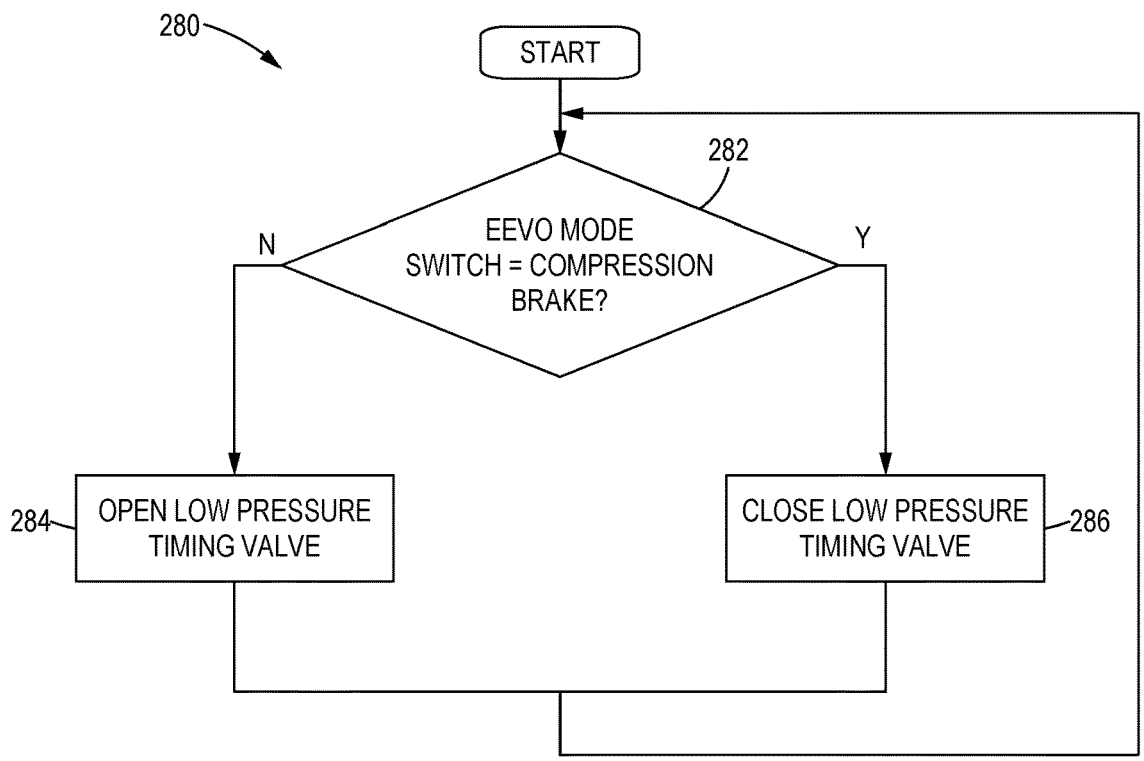
FIG. 16 is a flow diagram of an EEVO module mode switch monitoring routine in accordance with the present disclosure for the EEVO module.

As discussed above, some embodiments of the EEVO module 12 may include a compression braking mode where the lost motion provided by the low pressure timing valve 198 is shut off and the EEVO module 12 opens the exhaust valves 42 when the engine piston reaches top dead center of the compression stroke. Control of the EEVO module 12 to operate in either the EEVO mode or the compression braking mode may be dictated by an EEVO module mode switch that can be controlled by an operator. The ECM may be programmed with an EEVO module mode switch monitoring routine 280 such as that shown in FIG. 16. The monitoring routine 280 may begin at a block 282 where the ECM determines a position of the EEVO module mode switch. If the ECM determines that the EEVO module mode switch is in a compression braking mode position at the block 282, control may pass to a block 284 where the ECM may close the low pressure timing valve 198, or otherwise stop the pressurized fluid from being drained from the activation fluid passage during the initial displacement of the drive piston body 100. Without drainage through the low pressure timing valve 198, there is no lost motion in the drive piston 90 and the EEVO module 12 will open the exhaust valves 42 when the engine piston is at top dead center of the compression stroke and the engine will provide the compression braking force. If the ECM determines that the EEVO module mode switch is in an EEVO mode position at the block 282, control may pass to a block 286 where the ECM may open the low pressure timing valve 198, or otherwise allow the pressurized fluid to drain from the activation fluid passage during the initial displacement of the drive piston body 100. After the mode is set at the block 284 or the block 286, control passes back to the block 282 for the ECM to continue evaluating the EEVO module mode switch for position changes.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An early exhaust valve opening (EEVO) module for an engine having an exhaust valve, an exhaust rocker rotatable to move the exhaust valve between an exhaust valve closed position and an exhaust valve open position, a fuel injector, an injector rocker rotatable to cause the fuel injector to inject fuel into an engine cylinder of the engine, and a camshaft having an exhaust cam engaging and rotating the exhaust rocker between the exhaust valve open position and the exhaust valve closed position as the camshaft rotates and an injector cam engaging and rotating the injector rocker to cause the fuel injector to inject fuel into the engine cylinder as the camshaft rotates, the EEVO module comprising:
  an EEVO housing mounted to the engine proximate the exhaust rocker and the injector rocker, the EEVO housing having
    a drive piston bore having a drive piston bore top wall and a drive piston bore bottom end,
    a driven piston bore having a driven piston bore top wall and a driven piston bore bottom end,
    an activation fluid passage intersecting the drive piston bore and the driven piston bore proximate the drive piston bore top wall and the driven piston bore top wall, respectively,
    a fluid supply passage placing the activation fluid passage in fluid communication with a high pressure fluid source, and
    a spill passage intersecting the drive piston bore at a position between the drive piston bore top wall and the drive piston bore bottom end and placing the drive piston bore in fluid communication with a low pressure reservoir;
  a drive piston disposed within the drive piston bore and biased toward the drive piston bore top wall;
  a driven piston disposed within the driven piston bore and biased toward the driven piston bore top wall; and
  a low pressure timing valve disposed in the spill passage between the drive piston bore and the low pressure reservoir and having a timing valve release pressure,
  wherein the drive piston displaces toward the drive piston bore bottom end and engages the injector rocker and the driven piston displaces toward the driven piston bore bottom end and engages the exhaust rocker when an activation fluid passage pressure in the activation fluid passage is greater than an EEVO priming pressure that is required to displace the drive piston and the driven piston against piston biasing forces,
  wherein the low pressure timing valve opens to drain fluid from the drive piston bore to the low pressure reservoir and the driven piston does not displace the exhaust rocker when the activation fluid passage pressure is greater than the timing valve release pressure and less than an exhaust valve displacement pressure required for the driven piston to displace the exhaust rocker and open the exhaust valve, the injector rocker displaces the drive piston toward the drive piston bore top wall, and the drive piston does not close the spill passage, and
  wherein the driven piston displaces the exhaust rocker to open the exhaust valve when the injector rocker displaces the drive piston over the spill passage to close the spill passage and the activation fluid passage pressure is greater than the exhaust valve displacement pressure.

2. The EEVO module of claim 1, wherein an intersection of the spill passage with the drive piston bore is positioned so that the drive piston is displaced by the injector rocker and covers and closes the spill passage when an engine piston in the engine cylinder is 40° past a top dead center position of a compression stroke.

3. The EEVO module of claim 1, wherein the spill passage includes an annular groove in the drive piston bore.

4. The EEVO module of claim 1, wherein the EEVO housing includes a high pressure relief passage intersecting the activation fluid passage and fluidly connecting the activation fluid passage to the low pressure reservoir, the EEVO module comprising a high pressure relief valve disposed within the high pressure relief passage and having a relief valve release pressure that is greater than the exhaust valve displacement pressure so that the high pressure relief valve opens to drain fluid when displacement of the drive piston by the injector rocker and a cylinder pressure in the engine cylinder acting on the driven piston cause the activation fluid passage pressure to be greater than the relief valve release pressure.

5. The EEVO module of claim 1, comprising:
  a drive piston spring having a drive piston spring constant and biasing the drive piston toward the drive piston bore top wall; and
  a driven piston spring having a driven piston spring constant and biasing the driven piston toward the driven piston bore top wall, wherein the driven piston spring constant is greater than the drive piston spring constant so that the drive piston engages the injector rocker before the driven piston engages the exhaust rocker when pressurized fluid increases the activation fluid passage pressure to the EEVO priming pressure.

6. The EEVO module of claim 1, comprising a spill passage shutoff valve disposed within the spill passage between the drive piston bore and the low pressure timing valve, wherein the driven piston displaces the exhaust rocker to open the exhaust valve when the spill passage shutoff valve is closed, the injector rocker displaces the drive piston toward the drive piston bore top wall and the activation fluid passage pressure is greater than the exhaust valve displacement pressure.

7. The EEVO module of claim 1, comprising a fluid pressure control valve connect between the activation fluid passage and the high pressure fluid source, and between the activation fluid passage and the low pressure reservoir, wherein the fluid pressure control valve is configured to discharge pressurized fluid from the high pressure fluid source to the activation fluid passage when the fluid pressure control valve is in an EEVO engage mode, and is configured to drain the pressurized fluid from the activation fluid passage to the low pressure reservoir when the fluid pressure control valve is in an EEVO disengage mode.

8. A method for operating an early exhaust valve opening (EEVO) module of an engine, the method comprising:
  starting the engine;
  engaging, by the EEVO module, an injector rocker and an exhaust rocker so that rotation of the injector rocker caused by engagement of an injector cam of a camshaft of the engine causes the EEVO module to rotate the exhaust rocker to open an exhaust valve after a compression stroke of an engine piston in an engine cylinder;
  sensing an intake manifold pressure;
  continuing to engage the injector rocker and the exhaust rocker and rotate the exhaust rocker to open the exhaust valve in response to rotation of the injector rocker when the intake manifold pressure is less than a setpoint pressure; and
  disengaging the EEVO module from the injector rocker and the exhaust rocker so that rotation of the injector rocker does not cause the EEVO module to rotate the exhaust rocker when the intake manifold pressure is greater than the setpoint pressure.

9. The method of claim 8, comprising:
sensing the intake manifold pressure after deactivating the EEVO module; and
reengaging the injector rocker and the exhaust rocker with the EEVO module to rotate the exhaust rocker to open the exhaust valve in response to rotation of the injector rocker when the intake manifold pressure is less than the setpoint pressure.

10. The method of claim 8, comprising:
sensing a fuel flow rate for fuel flowing into the engine cylinder during an intake stroke;
continuing to engage the injector rocker and the exhaust rocker to rotate the exhaust rocker to open the exhaust valve in response to rotation of the injector rocker when the fuel flow rate is less than a setpoint flow rate; and
disengaging the EEVO module from the injector rocker and the exhaust rocker so that rotation of the injector rocker does not cause the EEVO module to rotate the exhaust rocker when the fuel flow rate is greater than the setpoint flow rate.

11. The method of claim 10, comprising:
sensing the fuel flow rate after deactivating the EEVO module; and
reengaging the injector rocker and the exhaust rocker with the EEVO module to rotate the exhaust rocker to open the exhaust valve in response to rotation of the injector rocker when the fuel flow rate is less than the setpoint flow rate.

12. The method of claim 8, comprising:
detecting a position of a generator emergency switch; and
disengaging the EEVO module from the injector rocker and the exhaust rocker so that rotation of the injector rocker does not cause the EEVO module to rotate the exhaust rocker when the generator emergency switch is moved to a generator emergency on position.

13. The method of claim 8, wherein the injector rocker and the injector cam of the camshaft are configured to cause a fuel injector to inject fuel into the engine cylinder when the engine piston is at a top dead center position of the compression stroke, wherein the EEVO module has a compression brake mode wherein the EEVO module rotates the exhaust rocker to open the exhaust valve when the engine piston is at the top dead center position of the compression stroke in response to rotation of the injector rocker, and wherein the EEVO module has an EEVO mode wherein the EEVO module rotates the exhaust rocker to open the exhaust valve when the engine piston is at a predetermined position within the engine cylinder after being at the top dead center position of the compression stroke in response to rotation of the injector rocker, the method comprising:
detecting a position of an EEVO module mode switch;
causing the EEVO module to operate in the compression brake mode when the EEVO module mode switch is moved to a compression brake mode position; and
causing the EEVO module to operate in the EEVO mode when the EEVO module mode switch is moved to an EEVO mode position.

14. An engine, comprising:
an engine cylinder;
an engine piston disposed within the engine cylinder;
an exhaust valve for the engine cylinder biased toward an exhaust valve closed position;
an exhaust rocker that is rotatable to move the exhaust valve from the exhaust valve closed position to an exhaust valve open position;
a fuel injector;
an injector rocker that is rotatable to cause the fuel injector to inject fuel into the engine cylinder;
a camshaft having an exhaust cam engaging and rotating the exhaust rocker to move the exhaust valve to the exhaust valve open position as the camshaft rotates and an injector cam engaging and rotating the injector rocker to cause the fuel injector to inject fuel into the engine cylinder as the camshaft rotates; and
an early exhaust valve opening (EEVO) module comprising:
an EEVO housing mounted proximate the exhaust rocker and the injector rocker,
a drive piston disposed within a drive piston bore of the EEVO housing, wherein the drive piston bore has a drive piston bore top wall and a drive piston bore bottom end, and the drive piston is biased toward the drive piston bore top wall,
a driven piston disposed within a driven piston bore of the EEVO housing, wherein the driven piston bore has a driven piston bore top wall and a driven piston bore bottom end, and the driven piston is biased toward the driven piston bore top wall, and wherein an activation fluid passage intersects the drive piston bore and the driven piston bore proximate the drive piston bore top wall and the driven piston bore top wall, respectively, and a fluid supply passage places the activation fluid passage in fluid communication with a high pressure fluid source, and
a low pressure timing valve disposed within a spill passage of the EEVO housing that intersects the drive piston bore at a position between the drive piston bore top wall and the drive piston bore bottom end and fluidly connecting the drive piston bore to a low pressure reservoir, wherein the low pressure timing valve has a timing valve release pressure,
wherein the EEVO module is primed by providing pressurized fluid from the high pressure fluid source to increase an activation fluid passage pressure to an EEVO priming pressure that causes the drive piston to displace toward the drive piston bore bottom end and engage the injector rocker and open the spill passage to the drive piston bore, and causes the driven piston to displace toward the driven piston bore bottom end and engage the exhaust rocker, wherein the EEVO priming pressure is less than the timing valve release pressure,
wherein, once the EEVO module is primed, displacement of the drive piston due to rotation of the injector rocker toward the drive piston bore top wall before the drive piston closes the spill passage increases the activation fluid passage pressure until the activation fluid passage pressure is at least equal to the timing valve release pressure and the low pressure timing valve opens to drain fluid from the drive piston bore to the low pressure reservoir, wherein the timing valve release pressure is less than an exhaust valve displacement pressure required for the driven piston to displace and cause the exhaust rocker to move the exhaust valve to the exhaust valve open position, and
wherein, after the spill passage is closed by the drive piston, further displacement of the drive piston toward the drive piston bore top wall increases the activation fluid passage pressure until the activation fluid passage pressure is greater than the exhaust valve displacement pressure and the driven piston is displaced and rotates the exhaust rocker move the exhaust valve to the exhaust valve open position.

15. The engine of claim 14, wherein an intersection of the spill passage with the drive piston bore is positioned so that the drive piston is displaced by the injector rocker and covers and closes the spill passage when the engine piston in the engine cylinder is 40° past a top dead center position of a compression stroke.

16. The engine of claim 14, wherein the spill passage includes an annular groove in the drive piston bore.

17. The engine of claim 14, wherein the EEVO housing includes a high pressure relief passage intersecting the activation fluid passage and fluidly connecting the activation fluid passage to the low pressure reservoir, the EEVO module comprising a high pressure relief valve disposed within the high pressure relief passage and having a relief valve release pressure that is greater than the exhaust valve displacement pressure so that the high pressure relief valve opens to drain fluid when the displacement of the drive piston by the injector rocker and a cylinder pressure in the engine cylinder acting on the driven piston cause the activation fluid passage pressure to be greater than the relief valve release pressure.

18. The engine of claim 14, wherein the EEVO module comprises:
 a drive piston spring having a drive piston spring constant and biasing the drive piston toward the drive piston bore top wall; and
 a driven piston spring having a driven piston spring constant and biasing the driven piston toward the driven piston bore top wall, wherein the driven piston spring constant is greater than the drive piston spring constant so that the drive piston engages the injector rocker before the driven piston engages the exhaust rocker when the EEVO module is primed.

19. The engine of claim 14, wherein the EEVO module comprises a spill passage shutoff valve disposed within the spill passage between the drive piston bore and the low pressure timing valve, wherein the driven piston rotates the exhaust rocker to move the exhaust valve to the exhaust valve open position when the EEVO module is primed, the spill passage shutoff valve is closed, the injector rocker displaces the drive piston toward the drive piston bore top wall and the activation fluid passage pressure is greater than the exhaust valve displacement pressure.

20. The engine of claim 14, comprising a fluid pressure control valve connected between the activation fluid passage and the high pressure fluid source, and between the activation fluid passage and the low pressure reservoir, wherein the fluid pressure control valve is configured to discharge the pressurized fluid from the high pressure fluid source to the activation fluid passage when the fluid pressure control valve is in an EEVO engage mode, and is configured to drain the pressurized fluid from the activation fluid passage to the low pressure reservoir when the fluid pressure control valve is in an EEVO disengage mode.

* * * * *